US007509430B2

(12) United States Patent
Oota

(10) Patent No.: US 7,509,430 B2
(45) Date of Patent: Mar. 24, 2009

(54) NETWORKED VIDEO DELIVERY SYSTEM FOR DISPLAYING DATA CONTENT AND VIDEO CONTENT REFERENCED BY THE DATA CONTENT

(75) Inventor: Yoshinori Oota, Kanagawa (JP)

(73) Assignee: Sony Corporation (JP)

( * ) Notice: Subject to any disclaimer, the term of this patent is extended or adjusted under 35 U.S.C. 154(b) by 649 days.

(21) Appl. No.: 10/487,959

(22) PCT Filed: Aug. 26, 2002

(86) PCT No.: PCT/JP02/08547

§ 371 (c)(1),
(2), (4) Date: Feb. 26, 2004

(87) PCT Pub. No.: WO03/019857

PCT Pub. Date: Mar. 6, 2003

(65) Prior Publication Data

US 2004/0250064 A1 Dec. 9, 2004

(30) Foreign Application Priority Data

Aug. 27, 2001 (JP) ............................. 2001-255583

(51) Int. Cl.
G06F 15/16 (2006.01)
H04N 7/16 (2006.01)
(52) U.S. Cl. ...................... 709/229; 709/219; 709/231; 725/25
(58) Field of Classification Search ................. 709/225, 709/217–219, 227–229, 230–238; 725/25, 725/31

See application file for complete search history.

(56) References Cited

U.S. PATENT DOCUMENTS

| 5,585,838 | A | * | 12/1996 | Lawler et al. | .................. 725/54 |
| 5,961,603 | A | | 10/1999 | Kunkel et al. | |
| 6,239,794 | B1 | * | 5/2001 | Yuen et al. | ..................... 725/41 |
| 6,312,336 | B1 | * | 11/2001 | Handelman et al. | ........... 463/40 |
| 6,392,664 | B1 | * | 5/2002 | White et al. | ................. 715/717 |
| 6,442,590 | B1 | * | 8/2002 | Inala et al. | .................. 709/204 |
| 6,538,672 | B1 | * | 3/2003 | Dobbelaar | .................. 715/810 |

(Continued)

FOREIGN PATENT DOCUMENTS

JP 2001-101190 4/2001

(Continued)

Primary Examiner—Joseph E Avellino
(74) Attorney, Agent, or Firm—Lerner, David, Littenberg, Krumholz & Mentlik, LLP

(57) ABSTRACT

The present invention relates to an information providing system, an information providing apparatus and a method thereof, and an information processing apparatus and a method thereof suppressing unauthorized use of the video contents. A stream contents server 3 issues permission information to a data contents server 10. The data contents server 10 provides the data contents to which the permission information is added to a TV receiver 7. A data broadcast engine 73 extracts identification information from the stream contents provided by the stream contents provider 1, and feeds it to the stream contents provider 1 together with the permission information extracted from the data contents. Based on the permission information and the identification information, the stream contents provider 1 judges whether the reference to the stream contents by the data contents be permitted, and transmits the result of judgement to the digital TV receiver 7. The invention can be adapted to a digital broadcast system.

21 Claims, 13 Drawing Sheets

U.S. PATENT DOCUMENTS

| | | | |
|---|---|---|---|
| 6,981,227 B1 * | 12/2005 | Taylor | 715/768 |
| 7,171,677 B1 * | 1/2007 | Ochiai | 725/80 |
| 7,240,033 B2 * | 7/2007 | Kuriya et al. | 705/51 |
| 7,383,438 B2 * | 6/2008 | Fahrny et al. | 713/169 |
| 2001/0037376 A1 * | 11/2001 | Ullman et al. | 709/218 |
| 2001/0037378 A1 * | 11/2001 | Hirayama | 709/219 |
| 2002/0087858 A1 * | 7/2002 | Oliver et al. | 713/156 |
| 2003/0115612 A1 * | 6/2003 | Mao et al. | 725/136 |

FOREIGN PATENT DOCUMENTS

| | | |
|---|---|---|
| JP | 2001-195337 A1 | 7/2001 |
| JP | 2001-298723 A1 | 10/2001 |
| JP | 2002-175470 A1 | 6/2002 |
| WO | WO-99/15968 A1 | 4/1999 |
| WO | WO-99/51030 A1 | 10/1999 |
| WO | WO-01/11874 A1 | 2/2001 |

* cited by examiner

NETWORKED VIDEO DELIVERY SYSTEM FOR DISPLAYING DATA CONTENT AND VIDEO CONTENT REFERENCED BY THE DATA CONTENT

TECHNICAL FIELD

This invention relates to an information providing system, an information providing apparatus and a method, and an information processing apparatus and a method. More particularly, the invention relates to an information providing system, an information providing apparatus and a method, and an information processing apparatus and a method, that prevent unauthorized use of information.

BACKGROUND ART

Owing to a widespread use of an Internet in recent years, it is allowed to receive data contents through the Internet by connecting a variety kinds of information equipment to the internet.

By adding, for example, an Internet connection function to a digital TV receiver, it is allowed to receive and display not only the data contents but also the digital TV signals (stream data) broadcast via, for example, a satellite by using the digital TV receiver.

When the Internet connection function is added to the digital TV receiver, however, the data contents received through the Internet may make a reference to a program (stream contents) that is on air for TV broadcast, whereby the data contents can be displayed on a screen and, at the same time, the TV images can be displayed as stream contents referred to by the data contents.

As a result, when there are, for example, conflicting sponsors, i.e., a sponsor A providing data contents and a sponsor B providing stream contents, there may take place such an undesired situation that the two contents provided by the conflicting sponsors are simultaneously displayed.

Further, the copyright of the image contents may be infringed if predetermined stream contents (image contents) are intentionally referred by the data contents.

DISCLOSURE OF THE INVENTION

This invention was accomplished in view of such circumstances, and intends to properly use information while suppressing unauthorized use of information.

In an information providing system of the invention:

a second information providing apparatus issues permission information to a first information providing apparatus for permitting the reference to the second information based on the first information, and provides the second information to an information processing apparatus while adding thereto identification information for identifying the second information;

the first information providing apparatus provides the first information to the information processing apparatus while including therein the permission information;

the information processing apparatus extracts the permission information contained in the first information provided by the first information providing apparatus, extracts the identification information contained in the second information provided by the second information providing apparatus, and transmits the permission information and the identification information that are extracted to the second information providing apparatus;

the second information providing apparatus judges whether the reference to the second information based on the first information be permitted, relying upon the permission information received from the information processing apparatus and upon the identification information; and the information processing apparatus controls the reference to the second information based on the first information, relying upon the result judged by the second information providing apparatus.

The first information may be the data contents, and the second information may be the stream contents.

The first information providing apparatus is capable of providing the first information to the information processing apparatus through a network.

The second information providing apparatus is capable of providing the second information to the information processing apparatus by broadcast.

The permission information can include identification information for identifying the second information permitting the reference thereto, a name of the second information permitting the reference thereto, a period for permitting the reference, an address of the second information providing apparatus that provides the second information permitting the reference thereto, or an address of the first information providing apparatus providing the first information that is to be referred to.

The permission information can include identification information for identifying the second information permitting the reference thereto, a name of the second information permitting the reference thereto, a period for permitting the reference, an address of the second information providing apparatus that provides the second information permitting the reference thereto, or an address of the first information providing apparatus providing the first information that is to be referred to, in the form of information enciphered by using a secret key of the second information providing apparatus.

The identification information for identifying the second information can include an ID for identifying the second information, a name of the second information, or information that varies depending upon the date and hour for providing the second information.

The identification information for identifying the second information can be enciphered by a public key of the second information providing apparatus.

The second information providing apparatus can possess a database for storing identifying information for identifying the second information, a name of the second information, information that varies depending upon the date and hour for providing the second information, period for providing the second information, or information related to the first information providing apparatus that is permitting the reference to the second information.

Information related to the first information providing apparatus permitting the reference to the second information can include address information of the first information providing apparatus and a permission period for permitting the first information providing apparatus to refer to the second information.

Provision is further made of a certificate-issuing apparatus for issuing a certification to at least either the first information providing apparatus or the second information providing apparatus, wherein the information processing apparatus obtains the certificate issued by the certificate-issuing apparatus from the first information providing apparatus or the second information providing apparatus, and controls the reference to the second information based on the first information by utilizing the certificate.

The certificate of the second information providing apparatus can include a public key of the second information providing apparatus.

The information processing apparatus can further obtain a certificate of the certificate-issuing apparatus to control the reference to the second information based on the first information by utilizing the certificate of the certificate-issuing apparatus in addition to utilizing the certificate of the first information providing apparatus and the certificate of the second information providing apparatus.

In an information providing method of the invention:

a second information providing apparatus issues permission information to a first information providing apparatus for permitting the reference to the second information based on the first information, and provides the second information to an information processing apparatus while adding thereto an identification information for identifying the second information;

the first information providing apparatus provides the first information to the information processing apparatus while including therein the permission information;

the information processing apparatus extracts the permission information contained in the first information provided by the first information providing apparatus, extracts the identification information contained in the second information provided by the second information providing apparatus, and transmits the permission information that is extracted and the identification information to the second infraction providing apparatus;

the second information providing apparatus judges whether the reference to the second information based on the first information be permitted, relying upon the permission information received from the information processing apparatus and upon the identification information; and the information processing apparatus controls the reference to the second information based on the first information, relying upon the result judged by the second information providing apparatus.

The first information processing apparatus of the present invention comprises:

first receiving means for receiving, from the first information providing apparatus, the first information including permission information which is issued from the second information providing apparatus to the first information providing apparatus and permits the reference to the second information based on the first information;

first extracting means for extracting the permission information included in the first information provided by the first information providing apparatus;

second receiving means for receiving, from the second information providing apparatus, the second information to which is added identification information for identifying the second information;

second extracting means for extracting the identification information included in the second information provided by the second information providing apparatus;

transmission means for transmitting the permission information extracted by the first extracting means and the identification information extracted by the second extracting means to the second information providing apparatus;

third receiving means for receiving, from the second information providing apparatus, the result of judgement concerning whether the reference to the second information based on the first information be permitted, relying upon the permission information and the identification information transmitted by the transmission means; and control means for controlling the reference to the second information based on the first information according to the result of judgement by the second information providing apparatus received from the third receiving means.

The first information may be the data contents, and the second information may be the stream contents.

The first receiving means is capable of receiving the first information through a network.

The second receiving means is capable of receiving the second information that is broadcast.

The permission information can include identification information for identifying the second information permitting the reference thereto, a name of the second information permitting the reference, a period for permitting the reference, an address of the second information providing apparatus that provides the second information permitting the reference thereto, or an address of the first information providing apparatus providing the first information that is to be referred to.

The permission information can include identification information for identifying the second information permitting the reference thereto, a name of the second information permitting the reference, a period for permitting the reference, an address of the second information providing apparatus that provides the second information permitting the reference thereto, or an address of the first information providing apparatus providing the first information that is to be referred to, in the form of information enciphered by using a secret key of the second information providing apparatus.

The identification information for identifying the second information can include an ID for identifying the second information, a name of the second information, or information that varies depending upon the date and hour for providing the second information.

The identification information for identifying the second information can be enciphered by a public key of the second information providing apparatus.

Provision is further made of obtaining means for obtaining a certificate issued by a certificate-issuing apparatus from at least either the first information providing apparatus or the second information providing apparatus, wherein control means controls the reference to the second information based on the first information by utilizing the certificate obtained by the obtaining means.

The certificate of the second information providing apparatus can include a public key of the second information providing apparatus.

The obtaining means can further obtain a certificate of the certificate-issuing apparatus, and the control means controls the reference to the second information based on the first information by utilizing the certificate of the certificate-issuing apparatus in addition to utilizing the certificate of the first information providing apparatus and the certificate of the second information providing apparatus.

An information processing method of the present invention comprises:

a first receiving step for receiving, from the first information providing apparatus, the first information including permission information which is issued from the second information providing apparatus to the first information providing apparatus and permits the reference to the second information based on the first information;

a first extract step for extracting the permission information included in the first information provided by the first information providing apparatus;

a second receiving step for receiving, from the second information providing apparatus, the second information to which is added identification information for identifying the second information;

a second extract step for extracting the identification information included in the second information provided by the second information providing apparatus;

a transmission step for transmitting the permission information extracted through a processing at the first extract step and the identification information extracted through a processing at the second extract step to the second information providing apparatus;

a third receiving step for receiving, from the second information providing apparatus, the result of judgement concerning whether the reference to the second information based on the first information be permitted, relying upon the permission information and the identification information transmitted through a step at the transmission step; and a control step for controlling the reference to the second information based on the first information according to the result of judgement by the second information providing apparatus received through a processing at the third receiving step.

A program in a recording medium of the present invention includes:

a first receiving step for receiving, from the first information providing apparatus, the first information including permission information which is issued from the second information providing apparatus to the first information providing apparatus and permits the reference to the second information based on the first information;

a first extract step for extracting the permission information included in the first information provided by the first information providing apparatus;

a second receiving step for receiving, from the second information providing apparatus, the second information to which is added identification information for identifying the second information;

a second extract step for extracting the identification information included in the second information provided by the second information providing apparatus;

a transmission step for transmitting the permission information extracted through a processing at the first extract step and the identification information extracted through a processing at the second extract step to the second information providing apparatus;

a third receiving step for receiving, from the second information providing apparatus, the result of judgement concerning whether the reference to the second information based on the first information be permitted, relying upon the permission information and the identification information transmitted through a processing at the transmission step; and a control step for controlling the reference to the second information based on the first information according to the result of judgement by the second information providing apparatus received through a processing at the third receiving step.

A program of the present invention executes:

a first receiving step for receiving, from the first information providing apparatus, the first information including permission information which is issued from the second information providing apparatus to the first information providing apparatus and permits the reference to the second information based on the first information;

a first extract step for extracting the permission information included in the first information provided by the first information providing apparatus;

a second receiving step for receiving, from the second information providing apparatus, the second information to which is added identification information for identifying the second information;

a second extract step for extracting the identification information included in the second information provided by the second information providing apparatus;

a transmission step for transmitting the permission information extracted through a processing at the first extract step and the identification information extracted through a processing at the second extract step to the second information providing apparatus;

a third receiving step for receiving, from the second information providing apparatus, the result of judgement concerning whether the reference to the second information based on the first information be permitted, relying upon the permission information and the identification information transmitted through a processing at the transmission step; and a control step for controlling the reference to the second information based on the first information according to the result of judgement by the second information providing apparatus received through a processing at the third receiving step.

The first information providing apparatus of the present invention comprises:

obtaining means for obtaining permission information for permitting the reference to the second information based on the first information from the other information providing apparatuses that provide, to the above information processing apparatus, the second information that is to be referred to by the first information; and providing means for providing, to the information processing apparatus, the first information inclusive of the permission information obtained from the obtaining means.

The first information may be the data contents, and the second information may be the stream contents.

The first information providing apparatus is capable of providing the first information to the information processing apparatus through a network.

The second information can be provided to the information processing apparatus by broadcast.

The permission information can include identification information for identifying the second information permitting the reference thereto, a name of the second information permitting the reference thereto, a period for permitting the reference, addresses of the other information providing apparatuses that provide the second information permitting the reference thereto, or an address of the information providing apparatus providing the first information that is to be referred to.

The permission information can include identification information for identifying the second information permitting the reference thereto, a name of the second information permitting the reference thereto, a period for permitting the reference, addresses of the other information providing apparatuses that provide the second information permitting the reference thereto, or an address of the information providing apparatus providing the first information that is to be referred to, in the form of information enciphered by using secret keys of the other information providing apparatuses.

There can be further provided distribution means for distributing the certificate received from the certificate-issuing apparatus to the information processing apparatuses.

A first information providing method of the present invention comprises:

an obtaining step for obtaining permission information for permitting the reference to the second information based on the first information from the other information providing apparatuses that provide, to the information processing apparatus, the second information that is to be referred to by the first information; and a providing step for providing, to the information processing apparatus, the first information inclusive of the permission information obtained through a processing at the obtaining step.

A first program in the recording medium of the present invention comprises:

an obtaining step for obtaining permission information for permitting the reference to the second information based on the first information from the other information providing apparatuses that provide, to the information processing apparatus, the second information that is to be referred to by the first information; and a providing step for providing, to the information processing apparatus, the first information inclusive of the permission information obtained through a processing at the obtaining step.

A first program of the present invention executes:

an obtaining step for obtaining permission information for permitting the reference to the second information based on the first information from the other information providing apparatuses that provide, to the information processing apparatus, the second information that is to be referred to by the first information; and a providing step for providing, to the information processing apparatus, the first information inclusive of the permission information obtained through a processing at the obtaining step.

A second information providing apparatus of the invention comprises:

issuing means for issuing permission information to the other information providing apparatuses for permitting the reference to second information based on the first information;

providing means for providing the second information to the information processing apparatus while adding thereto identification information for identifying the second information;

receiving means for receiving the permission information extracted by the information processing apparatus from the first information provided by the other information providing apparatuses and is transmitted, and for receiving the identification information extracted by the information processing apparatus from the second information provided by the providing means and is transmitted;

judging means for judging whether the reference to the second information based on the first information be permitted based on the permission information and the identification information received by the receiving means; and transmission means for transmitting the result judged by the judging means to the information processing apparatus.

The first information may be the data contents, and the second information may be the stream contents.

The providing means is capable of providing the second information to the information processing apparatus by broadcast.

The permission information can include identification information for identifying the second information permitting the reference thereto, a name of the second information permitting the reference thereto, a period for permitting the reference, an address of the information providing apparatus that provides the second information for permitting the reference, or addresses of the other information providing apparatuses providing the first information that is to be referred to.

The permission information can include identification information for identifying the second information permitting the reference thereto, a name of the second information permitting the reference thereto, a period for permitting the reference, an address of the information providing apparatus that provides the second information permitting the reference thereto, or addresses of the other information providing apparatuses providing the first information that is to be referred to, in the form of information enciphered by using a secret key of the information providing apparatus.

The identification information for identifying the second information may include an ID for identifying the second information, a name of the second information or information that varies depending upon the date and hour for providing the second information.

The identification information for identifying the second information may have been enciphered by the public key of the information providing apparatus.

There can be further provided a database for storing identification information for identifying the second information, a name of the second information, information that varies depending upon the date and hour for providing the second information, a period for providing the second information or information related to the other information providing apparatuses permitting the reference to the second information.

Information related to the other information providing apparatuses permitting the reference to the second information may include address information of the other information providing apparatuses and a permission period for permitting the other information providing apparatuses to refer to the second information.

There can be further provided distribution means for distributing the certificate issued from the certificate-issuing apparatus to the information processing apparatus.

The distribution means may distribute the certificate which also includes the public key of the information providing apparatus.

A second information providing method of the invention comprises:

an issuing step for issuing permission information to the other information providing apparatuses for permitting the reference to the second information based on the first information;

a providing step for providing the second information to the information processing apparatus while adding thereto identification information for identifying the second information;

a receiving step for receiving the permission information extracted by the information processing apparatus from the first information provided by the other information providing apparatuses and is transmitted, and for receiving the identification information extracted by the information processing apparatus from the second information provided through a processing at the providing step and is transmitted;

a judging step for judging whether the reference to the second information based on the first information be permitted based on the permission information and the identification information received through a processing at the receiving step; and a transmission step for transmitting the result judged through a processing at the judging step to the information processing apparatus.

A second program in the receiving medium of the invention includes:

an issuing step for issuing permission information to the other information providing apparatuses for permitting the reference to the second information based on the first information;

a providing step for providing the second information to the information processing apparatus while adding thereto identification information for identifying the second information;

a receiving step for receiving the permission information extracted by the information processing apparatus from the first information provided by the other information providing apparatuses and is transmitted, and for receiving the identification information extracted by the information processing apparatus from the second information provided through a processing at the providing step and is transmitted;

a judging step for judging whether the reference to the second information based on the first information be permitted based on the permission information and the identification information received through a processing at the receiving step; and a transmission step for transmitting the result judged through a processing at the judging step to the information processing apparatus.

A second program of the invention executes:

an issuing step for issuing permission information to the other information providing apparatuses for permitting the reference to the second information based on the first information;

a providing step for providing the second information to the information processing apparatus while adding thereto identification information for identifying the second information;

a receiving step for receiving the permission information extracted by the information processing apparatus from the first information provided by the other information providing apparatuses and is transmitted, and for receiving the identification information extracted by the information processing apparatus from the second information provided through a processing at the providing step and is transmitted;

a judging step for judging whether the reference to the second information based on the first information be permitted based on the permission information and the identification information received through a processing at the receiving step; and a transmission step for transmitting the result judged through a processing at the judging step to the information processing apparatus.

In the information providing system and in the information providing method of the present invention, the first information providing apparatus provides the first information inclusive of permission information to the information processing apparatus. The second information providing apparatus provides, to the information processing apparatus, the second information to which is added the identification information for identifying the second information. The information processing apparatus transmits the permission information extracted from the first information and the identification information extracted from the second information to the second information providing apparatus. Based upon the permission information and the identification information received from the information processing apparatus, the second providing apparatus judges whether the reference to the second information based on the first information be permitted. Relying upon the result judged by the second information providing apparatus, the information processing apparatus controls the reference to the second information based on the first information.

In the information processing apparatus and method, in the recording medium and in the program of the present invention, permission information is extracted from the first information provided by the first information providing apparatus, and identification information is extracted from the second information provided by the second information providing apparatus. The permission information and identification information that are extracted, are transmitted to the second information providing apparatus. The result of judging whether the reference to the second information based on the first information be permitted is received from the second information providing apparatus, and the reference to the second information based on the first information is controlled according to the result of judgement that is received.

In the first information providing apparatus and method, in the recording medium and in the program of the present invention, the permission information is obtained from the second information providing apparatus, and the first information inclusive of the permission information that is permitted, is provided to the information processing apparatus.

In the second information providing apparatus and method, in the recording medium and in the program of the present invention, the permission information is issued to the other information providing apparatuses, and the second information to which the identification information is added, is provided for the information processing apparatus. Based on the permission information and the identification information received from the information processing apparatus, it is judged weather the reference to the second information based on the first information be permitted, and the result of judgement is transmitted to the information processing apparatus.

BEST MODE FOR CARRYING OUT THE INVENTION

Figure 1:
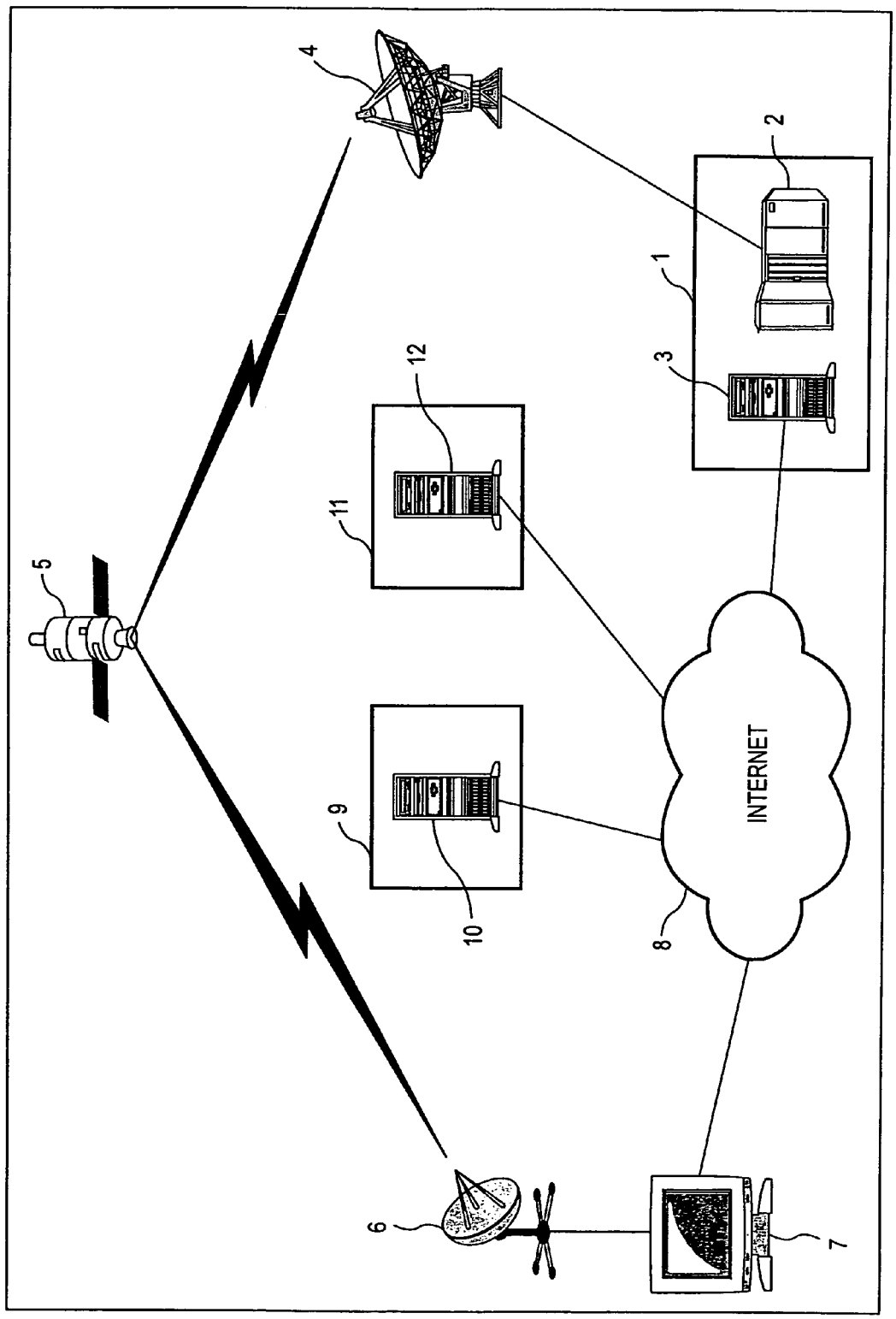
FIG. 1 is a diagram illustrating the constitution of an information providing system to which the present invention is applied.

FIG. 1 illustrates the constitution of an information providing system to which the present invention is applied. In the information providing system, a stream contents provider 1 includes a broadcasting unit 2 and a stream contents server 3. The broadcasting unit 2 and the stream contents server 3 are illustrated to be separate units for convenience, but they may be constituted integrally together.

The broadcasting unit 2 broadcasts the digital data of a broadcasting program (stream contents) from a satellite antenna 4 to the households through a digital broadcast satellite 5.

In each household, the digital TV receiver 7 receives the stream contents through a receiving antenna 6. FIG. 1 shows only one digital TV receiver 7. In practice, however, a large number of digital TV receivers receive the stream contents.

The digital TV receiver 7 is connected to an Internet 8. To the Internet 8 is further connected a data contents server 10 possessed by a data contents provider 9. Accordingly, the digital TV receiver 7 receives the data contents provided by the data contents server 10 through the Internet 8.

To the Internet 8 are further connected an authentication server 12 in a root authentication station 11 and the stream contents server 3 in the stream contents provider 1.

The authentication server 12 issues respective certificates to the stream contents provider 1 (stream contents server 3) and to the digital contents provider 9 (data contents server 10) through the Internet 8. As required, further, the authentication server 12 transmits its own certificate to the digital TV receiver 7 through the Internet 8.

Figure 2A:
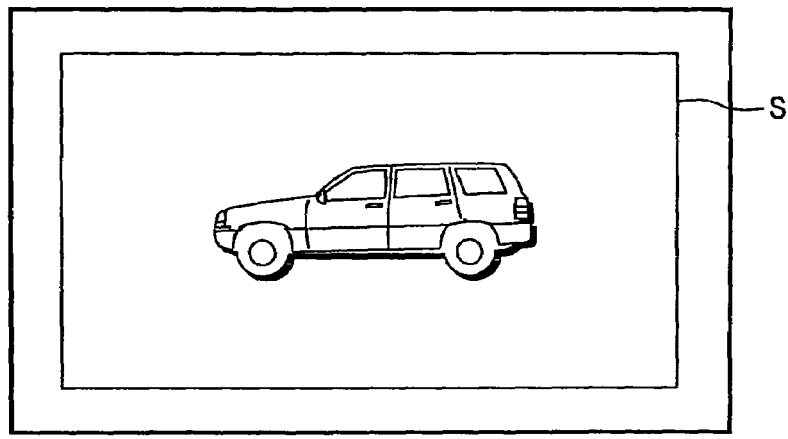
FIG. 2A is a diagram illustrating a state of displaying the data contents and the stream contents.
Figure 2B:
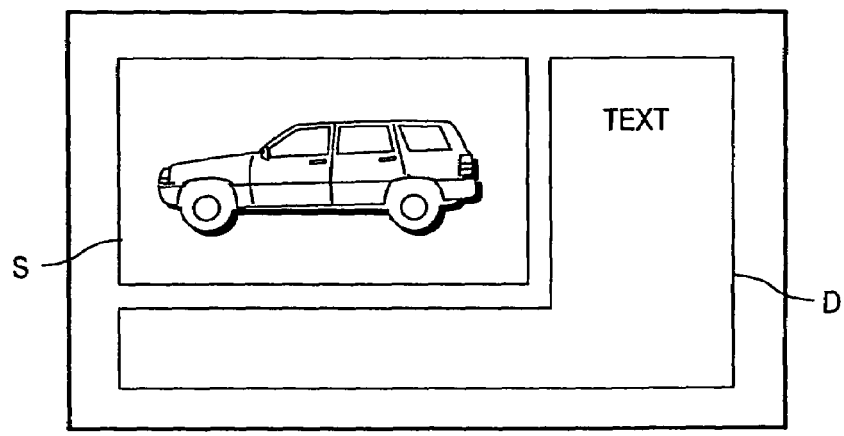
FIG. 2B is a diagram illustrating a state of displaying the data contents and the stream contents.

In the information providing system, as described above, the digital TV receiver 7 not only receives and displays by itself the stream contents S broadcast by the broadcasting unit 2 as shown in FIG. 2A but also receives and displays by itself the data contents D provided by the data contents server 10 through the Internet 8. When the data contents D are making a reference to the stream contents S, further, the stream contents S are simultaneously displayed on the same screen as the data contents data D as shown in FIG. 2B.

Figure 3:
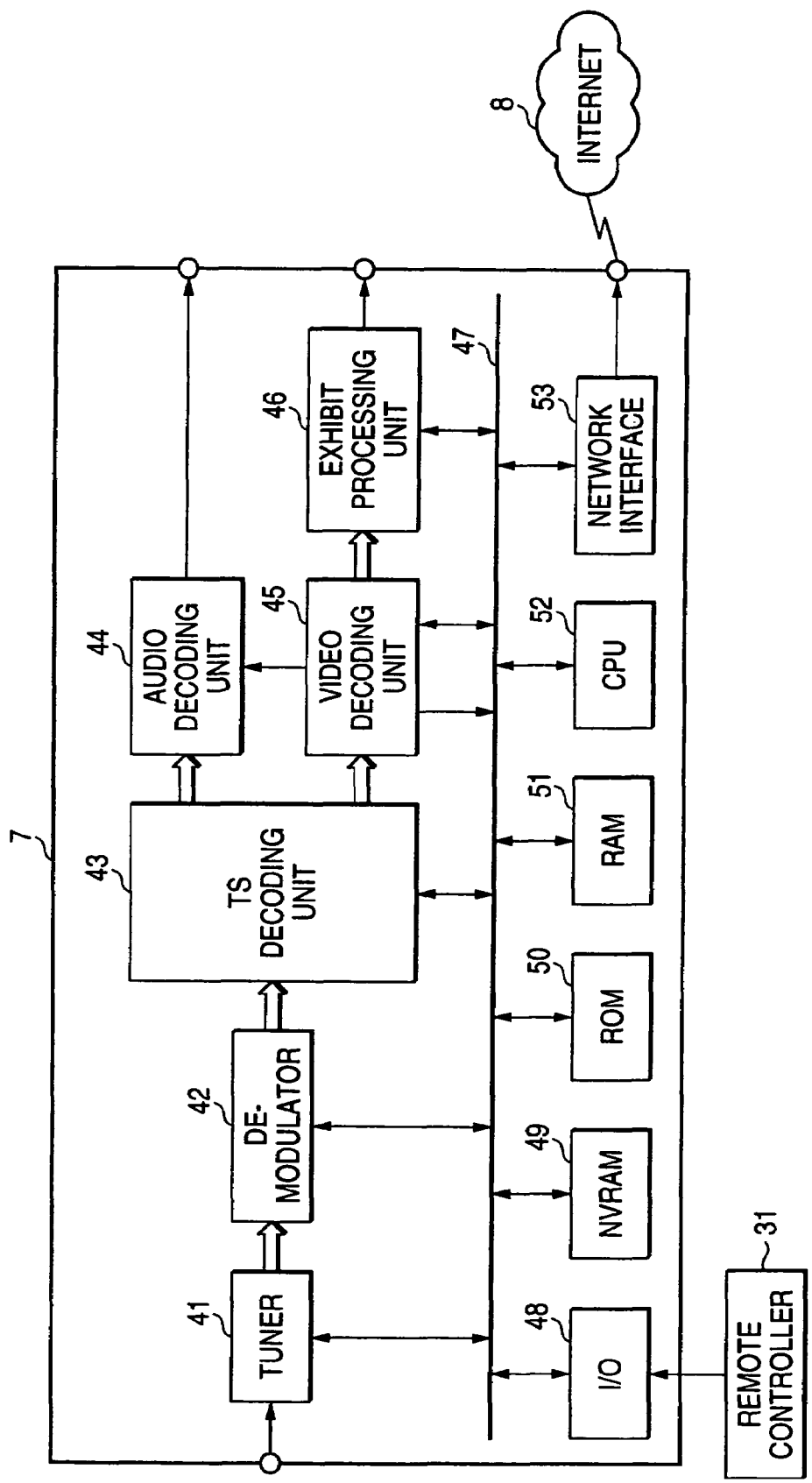
FIG. 3 is a block diagram illustrating a constitution of a digital TV receiver of FIG. 1.

FIG. 3 illustrates the constitution of a hardware of the digital TV receiver 7. A tuner 41 receives broadcast signals from the digital broadcast satellite 5, through the receiving antenna 6, and outputs the received signals to a demodulator 42. The demodulator 42 demodulates the signals received by the tuner 41, and sends the demodulated signals to a transport stream (TS) decoding unit 43.

The TS decoding unit 43 extracts, from the demodulated signals of the transport stream input from the demodulator 42, the video data and the audio data of a predetermined channel instructed by a CPU 52 through a system bus 47, sends the video data to a video decoding unit 45 and sends the audio data to a audio decoding unit 44.

The video decoding unit 45 decodes the input video data in compliance with an MPEG2 system, and sends them to an exhibit processing unit 46. The exhibit processing unit 46 synthesizes the video data input from the video decoding unit 45 with the data of data contents fed, as required, from the CPU 52 through the system bus 47, and sends them to a CRT 91 (FIG. 4) to display them.

Figure 4:
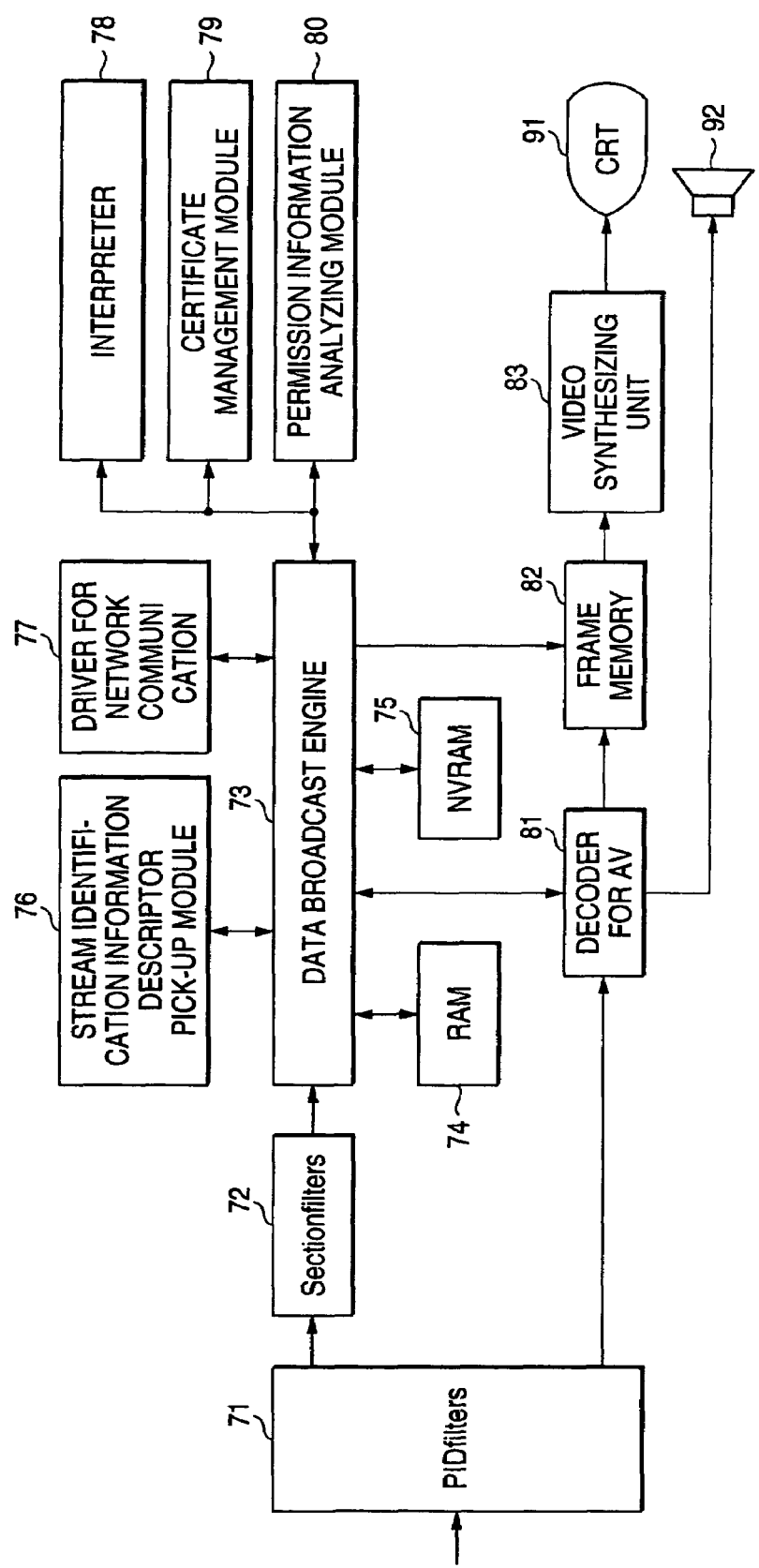
FIG. 4 is a diagram illustrating a constitution with the function of a TV receiver of FIG. 3 as a center.

The audio decoding unit 44 decodes the audio data input from the TS decoding unit 43 and sends them to a speaker 92 (FIG. 4).

An input/output (I/O) interface 48 feeds an operation signal input from a remote controller 31 to the CPU 52 through the system bus 47.

The CPU 52 executers a variety of processings according to programs stored in a ROM 50. A RAM 51 suitably stores programs and data necessary for the CPU 52 to execute a variety of processings. An NVRAM (non-volatile RAM) 49 suitably stores the data that must be maintained stored even after the power source of the digital TV receiver 7 has been turned off. A network interface 53 executes the interface processing relative to the Internet 8.

FIG. 4 illustrates the constitution with the function of the TV receiver 7 as a center. A PID (packet ID) filter 71 feeds, from the input transport stream to a decoder 81 for AV, a packet including video data and audio data based on a packet ID. The decoder 81 for AV decodes the video data that are input, feeds them to a frame memory 82 and stores them. The frame memory 82 stores the picture data of one screen input from the decoder 81 for AV. The frame memory 82 is further fed with video data of the data contents fed from a data broadcast engine 73, and synthesizes them with the video data fed from the decoder 81 for AV as data of a piece of screen.

The video data read out from the frame memory 82 are converted into video signals through a video synthesizing unit 83, and are output to a CRT 91 and are displayed.

The decoder 81 for AV decodes the packets of the input audio data and sends them to a speaker 92.

The PID filter 71 extracts packets other than the video data and the audio data from the input transport stream, and feeds them to a section filter 72. The section filter 72 extracts packets (data contents packets) of data broadcast from the input packets, and feeds them to the data broadcast engine 73. To the data broadcast engine 73 are connected a RAM 74 and an NVRAM 75. The data that must be processed by the data broadcast engine 73 are suitably expanded and stored in the RAM 74. In the NVRAM 75 are stored the data that must be stored even after the power source of the data broadcast engine 73 has been turned off.

A stream identification information descriptor extract module 76 executes a process for extracting the stream identification information included in the stream contents (included as a stream identification information descriptor). A driver 77 for network communication executes the communication processing through the Internet 8.

An interpreter 78 interprets and executes the script included in the data contents. A certificate management module 79 manages a certificate issued by the authentication server 12. A permission information analyzing module 80 analyzes permission information included in the data contents fed from the data contents server 10.

Figure 5:
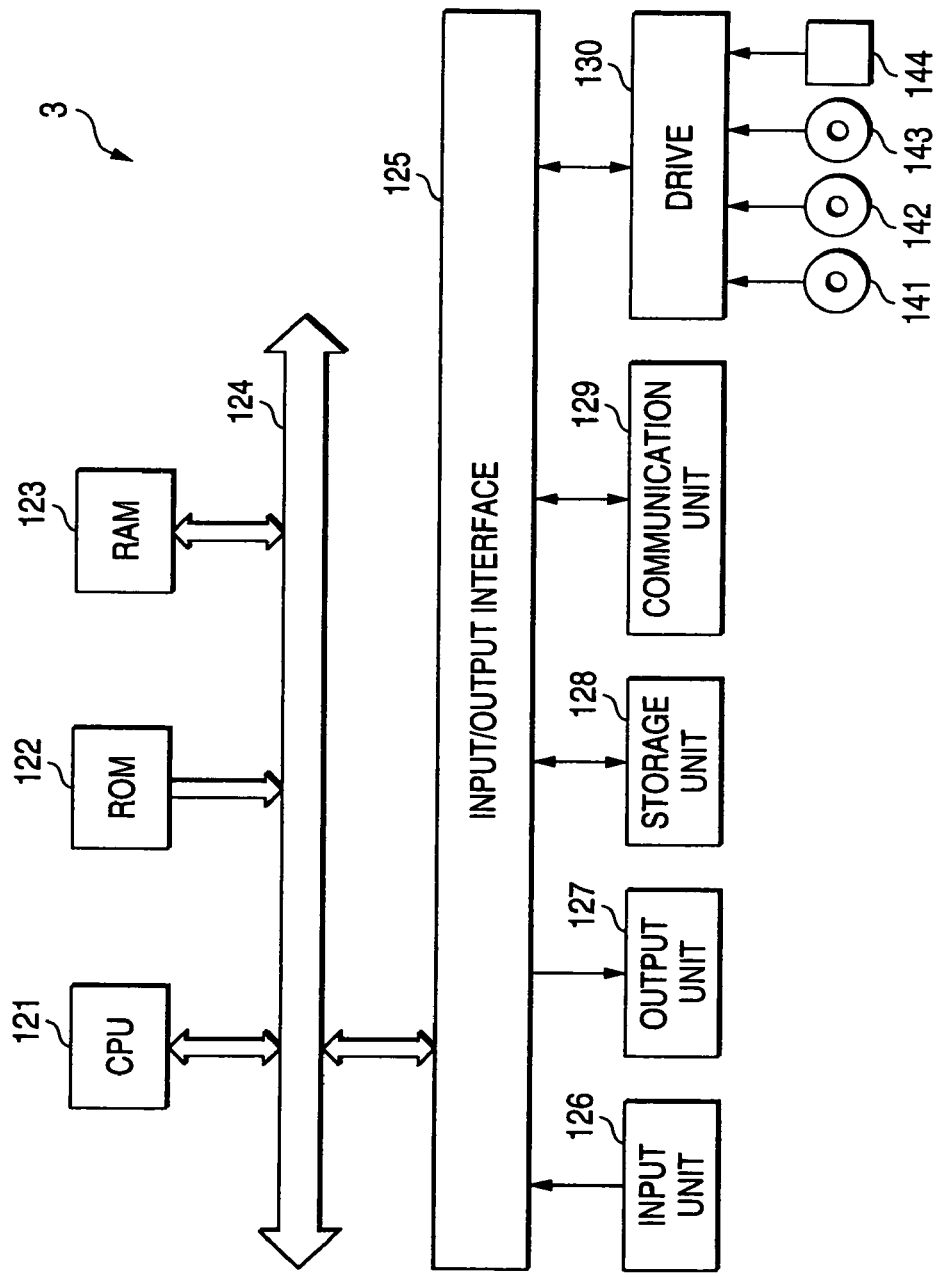
FIG. 5 is a block diagram illustrating a constitution of a stream contents server of FIG. 1.

FIG. 5 illustrates the constitution of the stream contents server 3. In FIG. 5, a CPU (central processing unit) 121 executes a variety of processings according to programs stored in a ROM (read-only memory) 122 or according to programs loaded by a storage unit 128 onto a RAM (random access memory) 123. In the RAM 123 are further stored data necessary for the CPU 121 to execute a variety of processings.

The CPU 121, ROM 122 and RAM 123 are connected to each other through a bus 124.. To the bus 124 is further connected an input/output interface 125.

To the input/output interface 125, there are connected an input unit 126 including a keyboard, a mouse, etc., an output unit 127 including a display which may be a CRT (cathode ray tube) or an LCD (liquid crystal display) and a speaker, a storage unit 128 constituted by a hard disk or the like, and a communication unit 129 constituted by a modem, a terminal adapter and the like. The communication unit 129 executes the communication processing through a network inclusive of the Internet 8.

As required, further, a driver 130 is connected to the input/output interface 125. A magnetic disk 141, an optical disk 142, a magnetic-optic disk 143, a semiconductor memory 144 and the like are suitably mounted thereon, and computer programs read out therefrom are, as required, installed in the storage unit 128.

Figure 6:
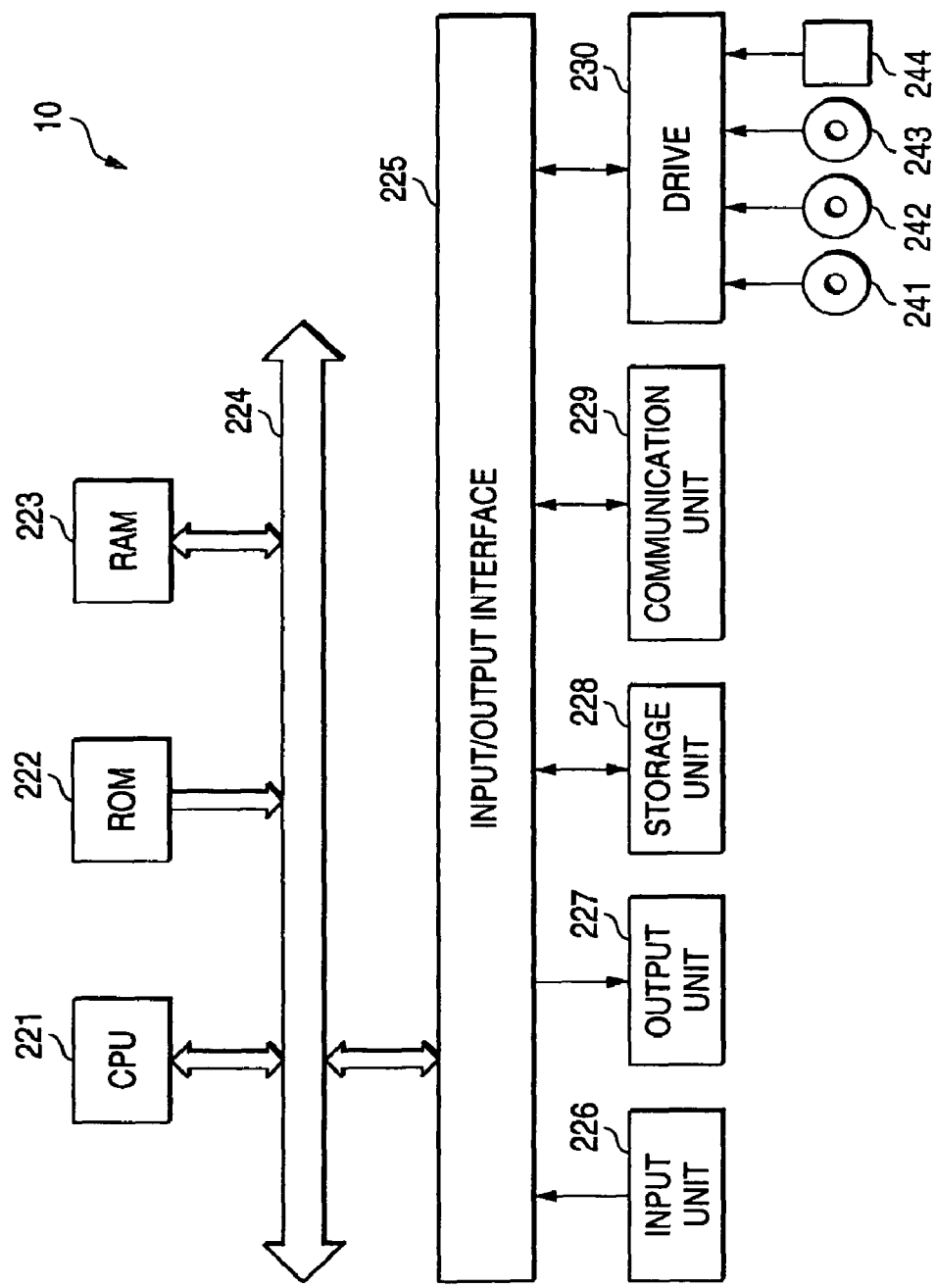
FIG. 6 is a block diagram illustrating a constitution of a data contents server of FIG. 1.

FIG. 6 illustrates the constitution of the data contents server 10. A CPU 221 or a semiconductor memory 244 constituting the data contents server 10 is constituted in the same manner as the CPU 121 or the semiconductor memory 144 in the stream contents server 3 shown in FIG. 5. The blocks of the same names are those blocks having the same functions, and their description is not repeated.

Figure 7:
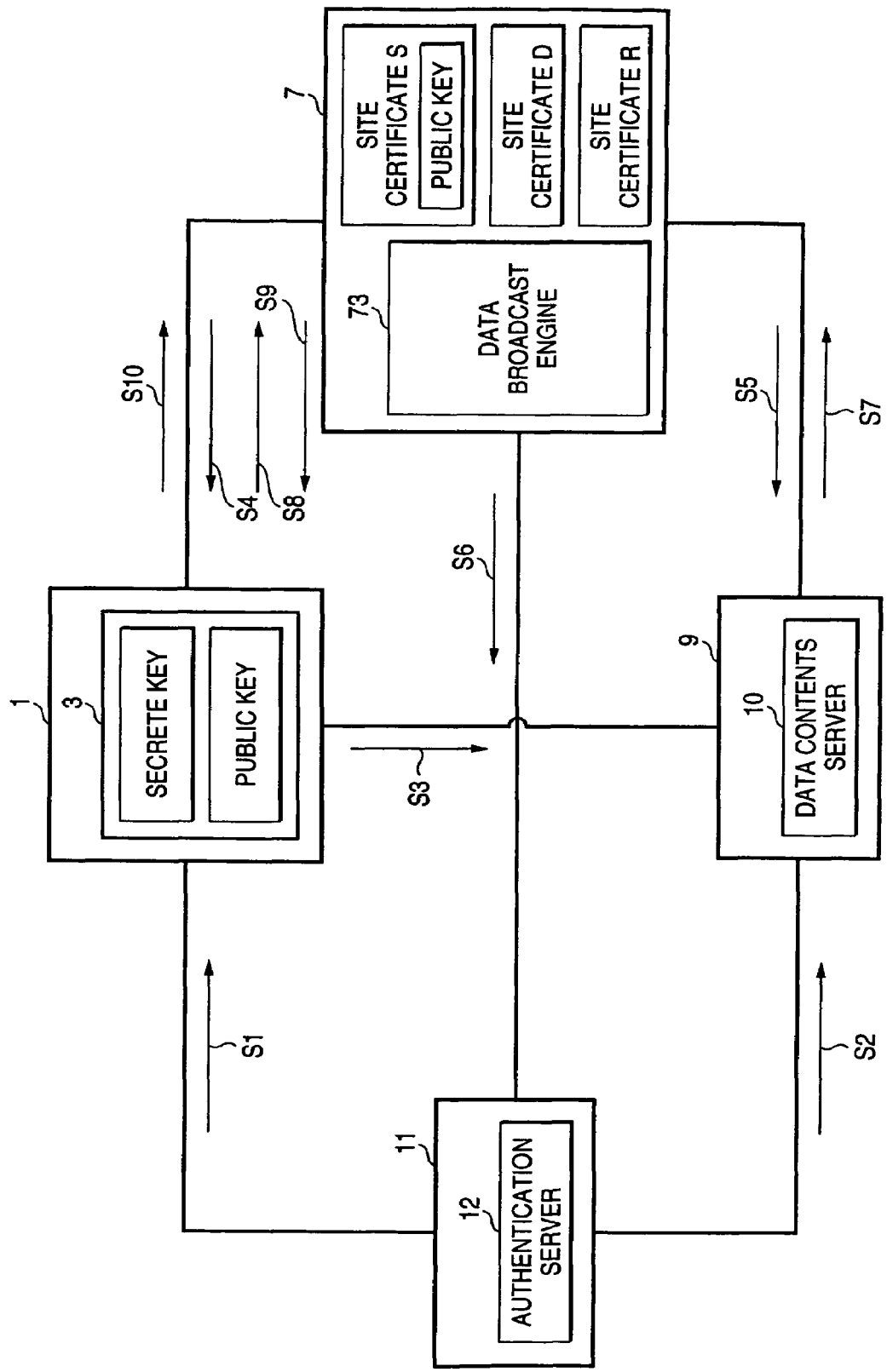
FIG. 7 is a diagram illustrating a basic processing of the information providing system of FIG. 1.

The basic processing of the information providing system will be described next with reference to FIG. 7.

The CPU 121 in the stream contents server 3 controls the communication unit 129 at step S1, makes an access to the authentication server 12 in the root authentication station 11 through the Internet 8 and requests an issuance of a site certificate. Based on this request, the authentication server 12 issued a site certificate S of the stream contents server 3 (stream contents provider 1). The site certificate S includes a public key corresponding to a secrete key assigned to the stream contents provider 1 (stream contents server 3). The CPU 121 in the stream contents server 3 receives, at step S1, the site certificate S through the communication unit 129, and feeds it to the storage unit 128 to store it therein.

Similarly, the CPU 221 of the data contents server 10 in the data contents provider 9 makes an access to the authentication server 12 at step S2 and requests the issuance of a site certificate. Based on this request, the authentication server 12 issues the site certificate D. The CPU 221 in the data contents server 10 receives the site certificate D at step S2 through the communication unit 229, and stores it in the storage unit 228.

The data contents server 10 requests permission for the reference at step S3 when it must make a reference to the stream contents provided by the stream contents server 3 in the data contents provided by the data contents server 10 itself. Being controlled by the CPU 221 in the data contents server 10, the request is transmitted from the communication unit 229 to the stream contents server 3 through the Internet 8.

Upon receipt of the request through the communication unit 129, the CPU 121 in the stream contents server 3 forms permission information (its details will be described later with reference to FIG. 11). The CPU 121 controls the communication unit 129 so as to transmit the permission information to the data contents server 10 through the Internet 8.

The CPU 221 in the data contents server 10 receives, at step S3, the permission information through the communication unit 229, feeds it to the storage unit 228 and stored it therein.

Through the above processing, the data contents server 10 is allowed to refer to the stream contents provided by the stream contents provider 1 in the data contents provided by the data contents server 10 itself.

The data contents provider 9 pays to the stream contents provider 1 for a price for the permission information.

On the other hand, the user of the TV receiver 7 obtains in advance the certificates of the data contents provider 9 (data contents server 10), stream contents provider 1 (stream contents server 3) and root authentication station 11 (authentication server 12) when the stream contents are referred to by the data contents provided by the data contents provider 9 and when the user wishes to simultaneously display (exhibit) them.

At step S4, therefore, the CPU 52 (data broadcast engine 73) in the digital TV receiver 7 controls the driver 77 for network communication, makes an access to the stream contents server 3 through the Internet 8, and requests to transmit a certificate S possessed by the stream contents server 3.

Upon receipt of the request through the communication unit 129, the CPU 121 in the stream contents server 3 reads out the certificate S that has been stored in the storage unit 128 in advance, and transmits it from the communication unit 129 to the digital TV receiver 7 through the Internet 8.

Upon receipt of the site certificate S from the stream contents server 3 at step S4, the data broadcast engine 73 in the digital TV receiver 7 feeds it to the storage unit 128 (certificate management module 79) and stores it therein.

The site certificate S includes a public key of the stream contents server 3 (stream contents provider 1).

At step S5, the data broadcast engine 73 controls the driver 77 for network communication, makes an access to the data contents server 10 through the Internet 8, and requests the data contents server 10 (data contents provider 9) to issue a site certificate.

Upon receipt of this request through the communication unit 229 at step S5, the CPU 221 in the data contents server 10 reads out a site certificate D stored in the storage unit 228, and transmits it to the digital TV receiver 7.

Upon receipt of the site certificate D from the data contents server 10 through the driver 77 for network communication at step S5, the data broadcast engine 73 in the digital TV receiver 7 feeds it to the certificate management module 79 and stores it therein.

At step S6, similarly, the data broadcast engine 73 makes an access to the authentication server 12 and requests to transmit a root certificate R. Based on this request, the authentication server 12 at step S6 transmits the root certificate R to the digital TV receiver 7.

Upon receipt of the root certificate R from the authentication server 12 at step S6, the data broadcast engine 73 in the digital TV receiver 7 feeds it to the certificate management module 79 and stores it therein.

As described above, the digital TV receiver 7 stores, in advance, the site certificate S of the stream contents server 3, the site certificate D of the data contents server 10 and the root certification R of the authentication server 12. These certificates describe that the source of issuance is the authentication server 12 (root authentication station 11).

When it is desired to be provided with the data contents provided by the data contents server 10, the data broadcast engine 73 makes an access to the data contents server 10 at step S7 and requests the provision of data contents.

Upon receipt of this request at step S7, the CPU 221 in the data contents server 10 reads out the data contents stored in the storage unit 228, and transmits them from the communication unit 129 to the digital TV receiver 7 through the Internet 8.

Here, when the data contents being provided are referring to the stream contents provided by the stream contents server 3, the permission information issued from the stream contents server 3 is added to the data contents.

Upon receipt of the data contents from the data contents server 10 at step S7, the data broadcast engine 73 in the digital TV receiver 7 feeds them to the interpreter 78 to interpret and execute them. Then, the data contents are converted into character data, are fed to the frame memory 80 and are stored therein. The data stored in the frame memory 80 are fed to the CRT 91 through a video synthesizing unit 83 and are displayed.

The data contents are also fed to the permission information analyzing module 80. The permission information analyzing module 80 analyzes the permission information included in the input data contents. As will be described later in detail with reference to FIG. 11, the permission information includes an ID for identifying a stream ID that has been permitted. At step S8, the broadcasting unit 2 in the stream contents provider 1 is broadcasting the stream contents while adding thereto the identification information (in a state of a stream identification information descriptor). The packets containing the stream identification information descriptor are extracted by the PID filter 71 and the section filter 72, and are fed to the data broadcast engine 73. The data broadcast engine 73 feeds the input packets to the stream identification information descriptor extract module 76. The stream identification information extract module 76 extracts the stream identification information descriptor from the packets. Being extracted, the stream identification information descriptor serves as the stream identification information.

At step S9, the data broadcast engine 73 transmits, to the stream contents server 3, the permission information extracted from the data contents received from the data contents server 10 through the processing at step S7 and the stream identification information extracted from the stream contents through the processing at step S8. Namely, the inquiry processing is executed concerning whether the permission information is warrantable.

Upon receipt of the inquiry of permission information through the communication unit 129 at step S9, the CPU 121 in the stream contents server 3 judges whether the permission information is warrantable based upon the database that has been held.

At step S10, the CPU 121 in the stream contents server 3 transmits the judged results, i.e., transmits the permission information for referring to the stream contents, to the digital TV receiver 7 through the Internet 8.

Upon receipt of the result of judgement from the stream contents server 3 at step S10, the data broadcast engine 73 in the digital TV receiver 7 causes the decoder 81 for AV to decode the stream contents based on the results of judgement, feeds them to the frame memory 80, and describes them on a field of the same screen as that of the corresponding data contents.

This is output to the CRT 91 through the video synthesizing unit 83 and is displayed. Thus, the CRT 91 displays on the same screen, as shown in FIG. 2B, a picture describing the data contents D and the stream contents S referred to thereby. That is, the two contents can be simultaneously utilized on the same screen.

Figure 2C:
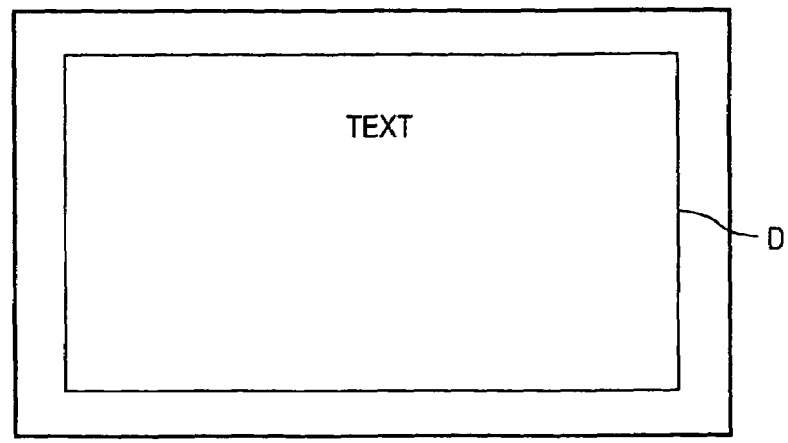
FIG. 2C is a diagram illustrating a state of displaying the data contents and the stream contents.

When the judged result of the stream contents server 3 is not permitting the reference to the stream contents S, the data contents D alone are displayed as shown in FIG. 2C.

Figure 8:
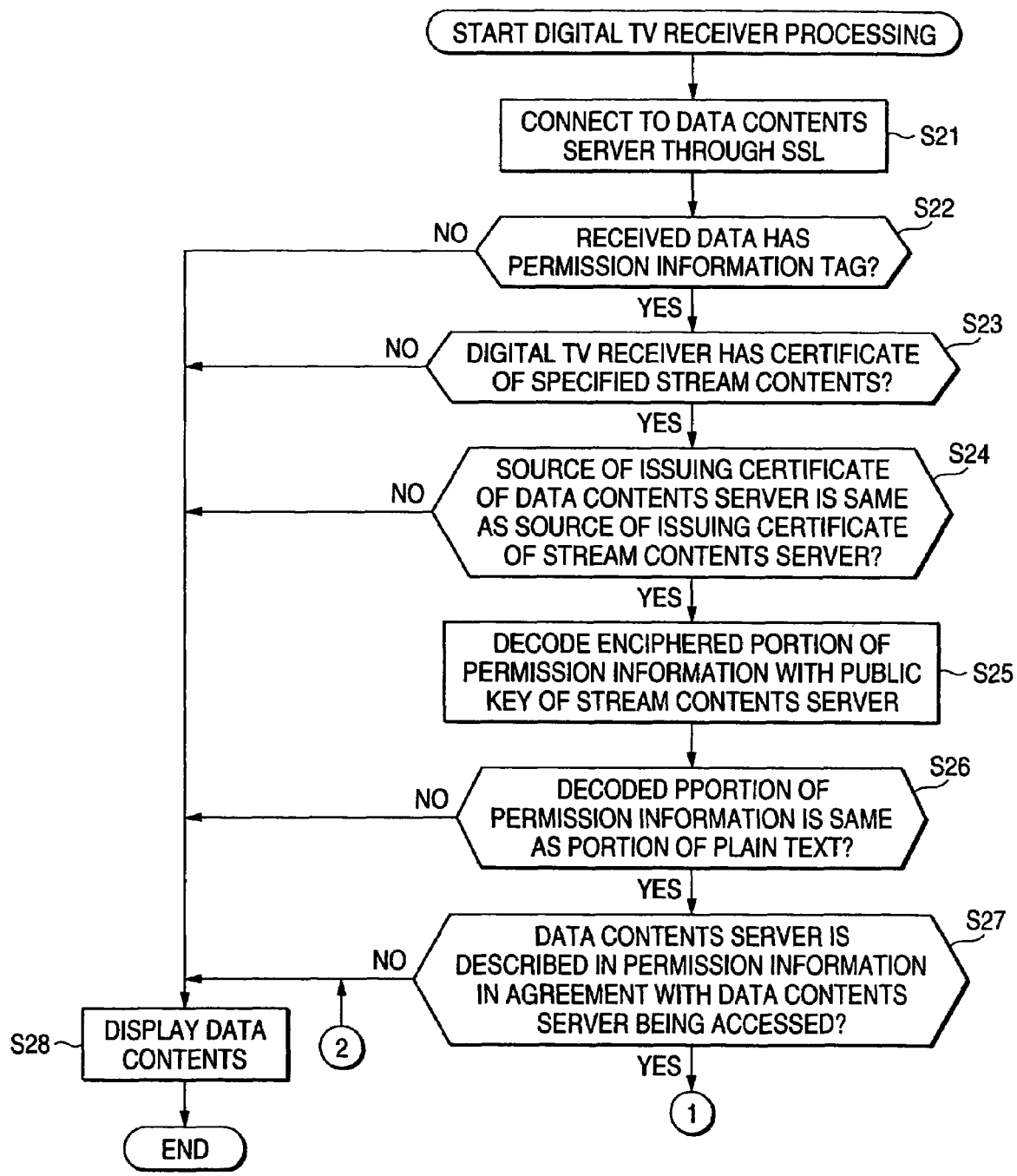
FIG. 8 is a flowchart illustrating the processing of the digital TV receiver of FIG. 1.

Among the processings roughly described with reference to FIG. 7, the processing of the digital TV receiver 7 will be described in further detail with reference to FIGS. 8 and 9.

At step S21, the data broadcast engine 73 controls the driver 77 for network communication and makes an access to the data contents server 10 based on an SSL (secure sockets layer) through the Internet 8. Then, the data broadcast engine 73 requests the data contents server 10 to deliver the data contents.

Based on this request, the CPU 221 in the data contents server 10 reads the data contents from the storage unit 228 and transmits them from the communication unit 229 to the digital TV receiver 7 through the Internet 8. Here, as described above, the CPU 221 delivers the data contents while adding thereto the permission information issued from the stream contents server 3 that is providing the stream contents when the data contents are referring to the stream contents.

Thus, the data broadcast engine 73 in the digital TV receiver 7 receives the contents data transmitted from the data contents server 10.

Figure 10:
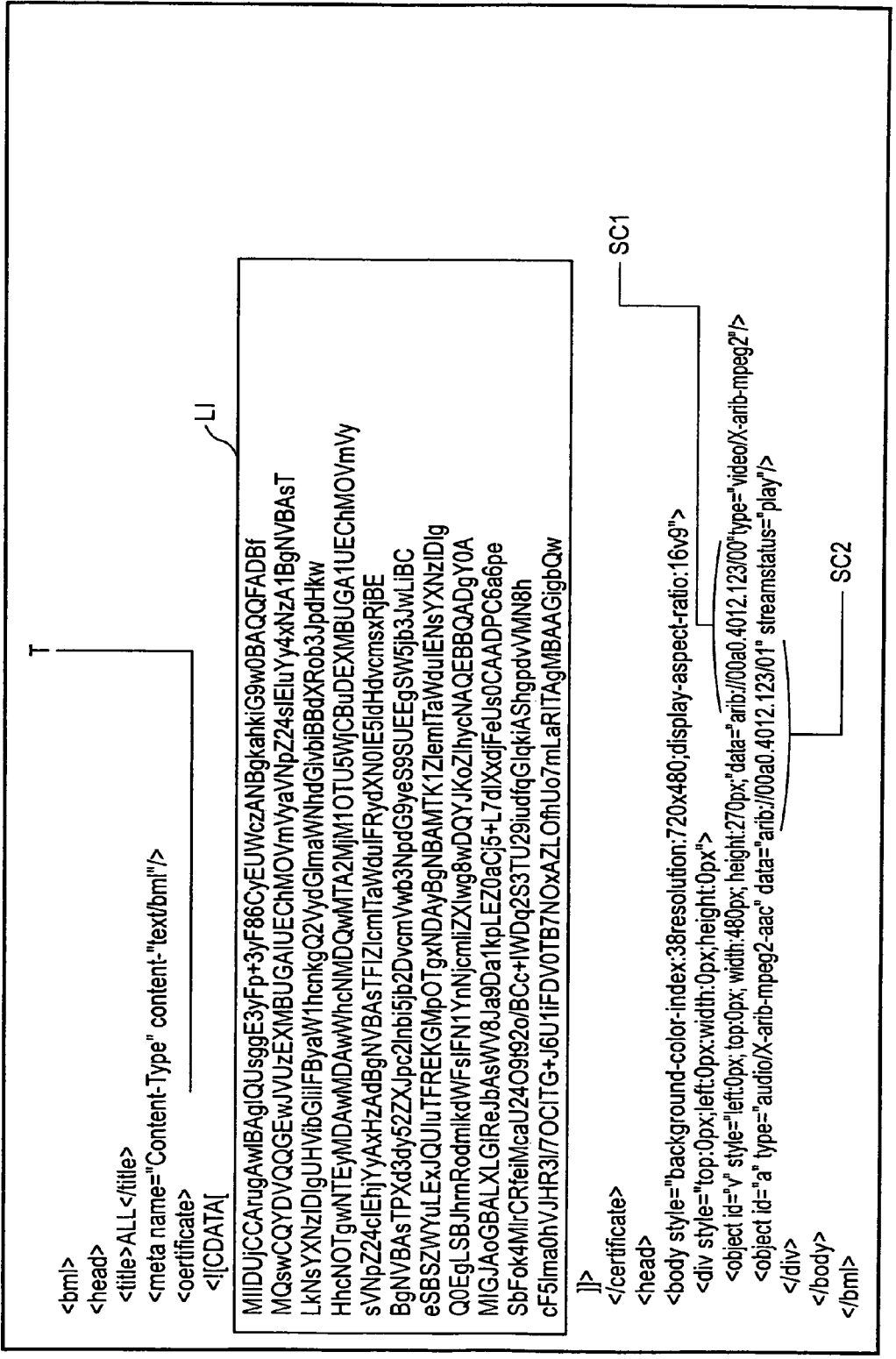
FIG. 10 is a diagram illustrating an example of the data contents received by the digital TV receiver of FIG. 1.

FIG. 10 illustrates an example of data transmitted to the digital TV receiver 7 from the data contents server 10. In FIG. 10, <certificate> is a permission information tag T which is added when there exists permission information. Information in a range surrounded by a solid line in the drawing represents permission information LI. The permission information LI has been enciphered with a secrete key of the stream contents provider 1 (stream contents server 3). The permission information LI is issued from the stream contents server 3 to the data contents server 10 in a state of being enciphered at step S3 in FIG. 7 described above.

In these data, "arib://00a0.4012.123/00" and "arib://00a0.4012.123/01" represent the stream contents SC1 and the stream contents SC2 referred to by the data contents.

Figure 11:
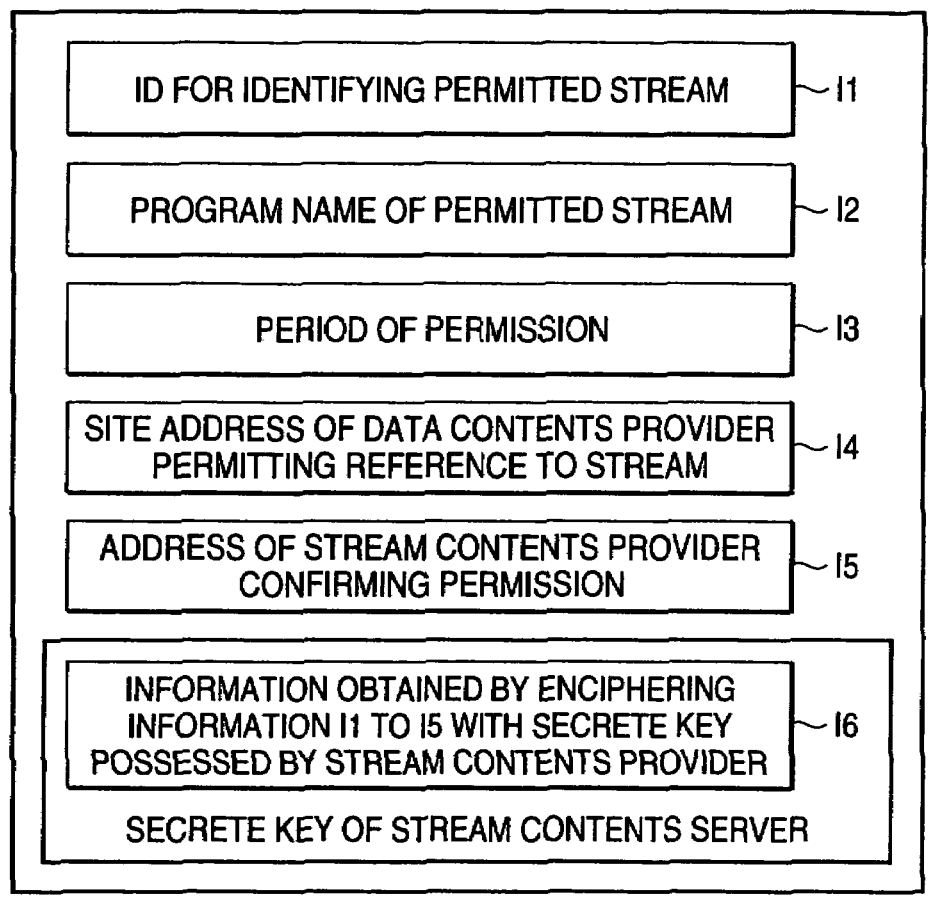
FIG. 11 is a diagram illustrating the structure of permission information.

FIG. 11 illustrates a structure of the permission information issued to the data contents server 10 from the stream contents server 3. In this example, the permission information includes, in the form of plain texts, information I1 which is an ID for identifying the stream permitted by the stream contents provider 1, information I2 which is the name of the program of the permitted stream, information I3 which is a period of permission, information I4 representing a site address of the data contents provider permitting the reference to the stream (site address of the data contents server 10 in the case of FIG. 7), and information I5 representing an address of the stream contents provider (stream contents provider 1 in the case of FIG. 7) that confirms the permission. The permission information further includes information I6 obtained by enciphering the above-mentioned information I1 to I5 with a secrete key possessed by the stream contents provider 1 (stream contents server 3).

The permission information LI of FIG. 10 schematically represents the information I6 of FIG. 11. Information I1 to I5 of FIG. 11 have not been diagramed in FIG. 10.

At step S22, the permission information analyzing module 80 judges whether the data received from the data contents server 10 are having a permission information tag T. The permission information tag T is the <certificate> shown in FIG. 10.

When the permission information T is not included in the received data, the data contents are not permitted to make a reference to the stream contents without the need of examining other information. This is because when there exists the permission information LI, the permission information tag T is necessarily included therein. Therefore, the permission information tag T that is not included means that the permission information LI is not included in the received data. In this case, the routine proceeds to step S28, and the data broadcast engine 73 executes the processing for displaying the data contents only. That is, the data broadcast engine 73 transferers the data contents interpreted and executed by the interpreter 78 to the frame memory 82 to describe them, and sends them from the video synthesizing unit 83 to the CRT 91 to display them. In this case, therefore, the data contents D only are displayed as shown in FIG. 2C. Namely, in this case, it is not allowed to simultaneously use the stream contents.

When it is judged at step S22 that the received data have the permission information tag T, the routine proceeds to step S23 where it is judged that the certificate of the specified stream contents (referred to by the data contents) is possessed by the digital TV receiver 7. In FIG. 10, for example, the stream contents SC1 and the stream contents SC2 have been specified in the data contents. It is, therefore, judged whether a site certificate S of the site (stream contents server 3 in the example of FIG. 7) providing the two stream contents has already been registered in the certificate management module 79. When there exists no site certificate S in FIG. 7 of the stream contents site that provides the specified stream contents, it has not been permitted to refer to the stream contents. Therefore, the routine proceeds to step S28, and the processing is executed for exhibiting the data contents D only.

When it is so judged at step S23 that there has been registered a site certificate S of the stream contents site that provides the specified stream contents, the routine proceeds to step S24 where the data broadcast engine 73 controls the certificate management module 79 and it is judged if the source of issuing the site certificate D of the data contents server 10 is the same as the source of issuing the site certificate S of the stream contents server 3. Namely, it is judged here if the source of issuing the site certificate D of the data contents server 10 and the source of issuing the site certificate S of the stream contents server 3 in FIG. 7 are the certificates issued from a common reliable authentication station. Concretely speaking, the certificate management module 79 has received and registered, in advance, the route certificate R from the authentication server 12 of the route authentication station 11. It is, therefore, judged here if either one or both of the site certificate D and the site certificate S are the ones issued by the source that has issued the route certificate R. When at least either the site certificate D or the site certificate S is the one issued by a source different from the source that has issued the route certificate R, it is probable that the certificate is the forged one. Therefore, the routine proceeds to step S28 to execute the processing for displaying the data contents only.

When it is judged that the site certificate D and the site certificate S are the ones issued from the same reliable authentication station, the routine proceeds to step S25 where the data broadcast engine 73 controls the permission information analyzing module 80 to decode the enciphered portion (information I6 in FIG. 11) in the permission information included in the received data by utilizing the public key of the stream contents server 3 included in the site certificate S. As described earlier, this information I6 has been enciphered with the secrete key of the stream contents server 3. Therefore, this information can be decoded with the corresponding public key. As a result of decoding, there are obtained information I1 to I5 shown in FIG. 11.

At step S26, the permission information analyzing module 80 compares the information I1 to I5 obtained by decoding at step S25 with the information I1 to I5 that have been included in the form of a plain text in the received data, and judges whether they are the same. When they are not the same, it means that the permission information has been manipulated. Therefore, the routine proceeds to step S28 where the processing is executed for displaying the data contents only.

On the other hand, when it is judged that the information obtained by decoding at step S25 is the same as the information that has been included in the form of a plain text in the received data, it means that the permission information has not been manipulated. Therefore, the routine proceeds to step S27 where the permission information analyzing module 80 judges whether the data contents server described in the permission information is in agreement with the data contents server that is now being accessed. As described with reference to FIG. 11, the permission information includes the address of the data contents server to which the permission information is issued (site address information I4 of the data contents provider which permits the reference to the stream in FIG. 11). The permission information analyzing module 80 judges whether the address of the data contents server which is now being accessed is in agreement with the site address described in the information I4 through the driver 77 for network communication. When the two are not in agreement, it is probable that the data contents server now being accessed is not receiving the issuance of permission information. Therefore, the routine proceeds to step S28 where a processing is executed for displaying the data contents only. That is, simultaneous use of the stream contents is inhibited.

If it is judged at step S27 that the data contents server now being accessed is the contents server described in the information I4, the routine proceeds to step S29 where the data broadcast engine 73 obtains the stream identification information descriptor of the stream specified (referred to) in the received data contents from the broadcast waves, i.e., from the stream contents. The stream identification information descriptor has been included in the stream contents in an enciphered state.

Figure 12:
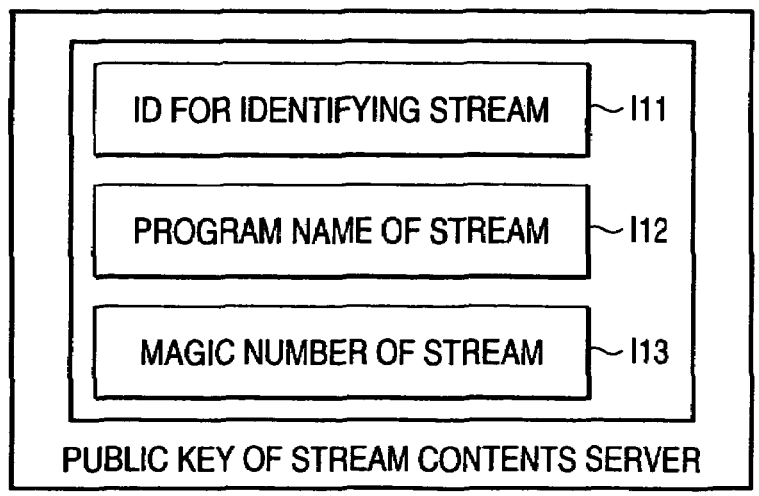
FIG. 12 is a diagram illustrating the structure of stream identification information.

That is, the broadcasting unit 2 in the stream contents provider 1 adds, for example, the stream identification information of the constitution shown in FIG. 12 to the stream contents that are to be broadcast, the stream identification information being enciphered with the public key of the stream contents provider 1 (broadcasting unit 2 and the stream contents server 3), and broadcasts them to the households from the satellite antenna 4 through the digital broadcast satellite 5.

The stream identification information descriptor extract module 76 in the digital TV receiver 7 extracts the stream identification information descriptor from the stream contents that are input through the data broadcast engine 73. The stream contents are transmitted according to the format of a transport stream of MPEP2 and, hence, the stream identification information is transmitted in the form of a descriptor being included in a program information table. The stream identification information descriptor extract module 76 extracts the stream identification information descriptor, and extracts the stream identification information from the descriptor. As described above, the stream identification information has been enciphered with the public key of the stream contents provider 1. Accordingly, the digital TV receiver 7 is not allowed to decode the stream identification information.

Referring to FIG. 12, the stream identification information is constituted by information I111 serving as an ID for identifying the stream, information I112 as a program name of the stream, and a magic number I113 of the stream enciphered with the public key of the stream contents provider 1.

The magic number of the stream is information that varies depending upon the date and hour of when the stream contents are broadcast. Even the stream contents having the ID for identifying the same stream may often be broadcast again on a different day. By suitably varying the magic number of the stream depending upon the date and hour of broadcast, therefore, the stream contents received through the digital TV receiver 7 are recorded in a recording medium to prevent such an occurrence that the stream contents are refereed to many times.

At step S30, the data broadcast engine 73 makes an access to the data contents server 10 through the processing at step S21, and transmits the permission information obtained from the received data contents and the enciphered stream identification information extracted by the descriptor extract module 76 through the processing at step S29, to the stream contents server 3 from the driver 77 for network transmission through the Internet 8.

Thus, the enciphered stream identification information really taken out from the stream contents is transmitted to the stream contents server 3, preventing such an occurrence that the stream contents once received are repetitively referred to by the digital TV receiver 7.

As will be described later with reference to the flowchart of FIG. 13, the stream contents 3 servers judges whether the reference to the stream contents be permitted based on the permission information and the enciphered stream identification information transmitted from the digital TV receiver 7, and notifies the result of judgement as a response (steps S61, S62 in FIG. 13).

At step S31, therefore, the data broadcast engine 73 stands by until there is a response from the stream contents server 3. When there is a response, the data broadcast engine 73 at step S32 receives the response from the stream contents server 3.

At step S33, the data broadcast engine 73 judges whether the response received through a processing at step S32 is permitting the exhibit of the stream contents. When it is not permitting the exhibit, the routine proceeds to step S28 where a processing is executed for exhibiting the data contents only.

When it is judged at step S33 that the response from the stream contents server 3 is permitting the exhibit of the stream contents, the routine proceeds to step S34 where the data broadcast engine 73 causes the decoder 81 for AV to decode the stream contents, feeds them to the frame memory 80, describes them on the same screen as the data contents, and sends them to the CRT 91 through the video synthesizing unit 83 to display them. Thus, the data contents D and the stream contents S are simultaneously displayed on the same screen as shown in, for example, FIG. 2B.

Figure 13:
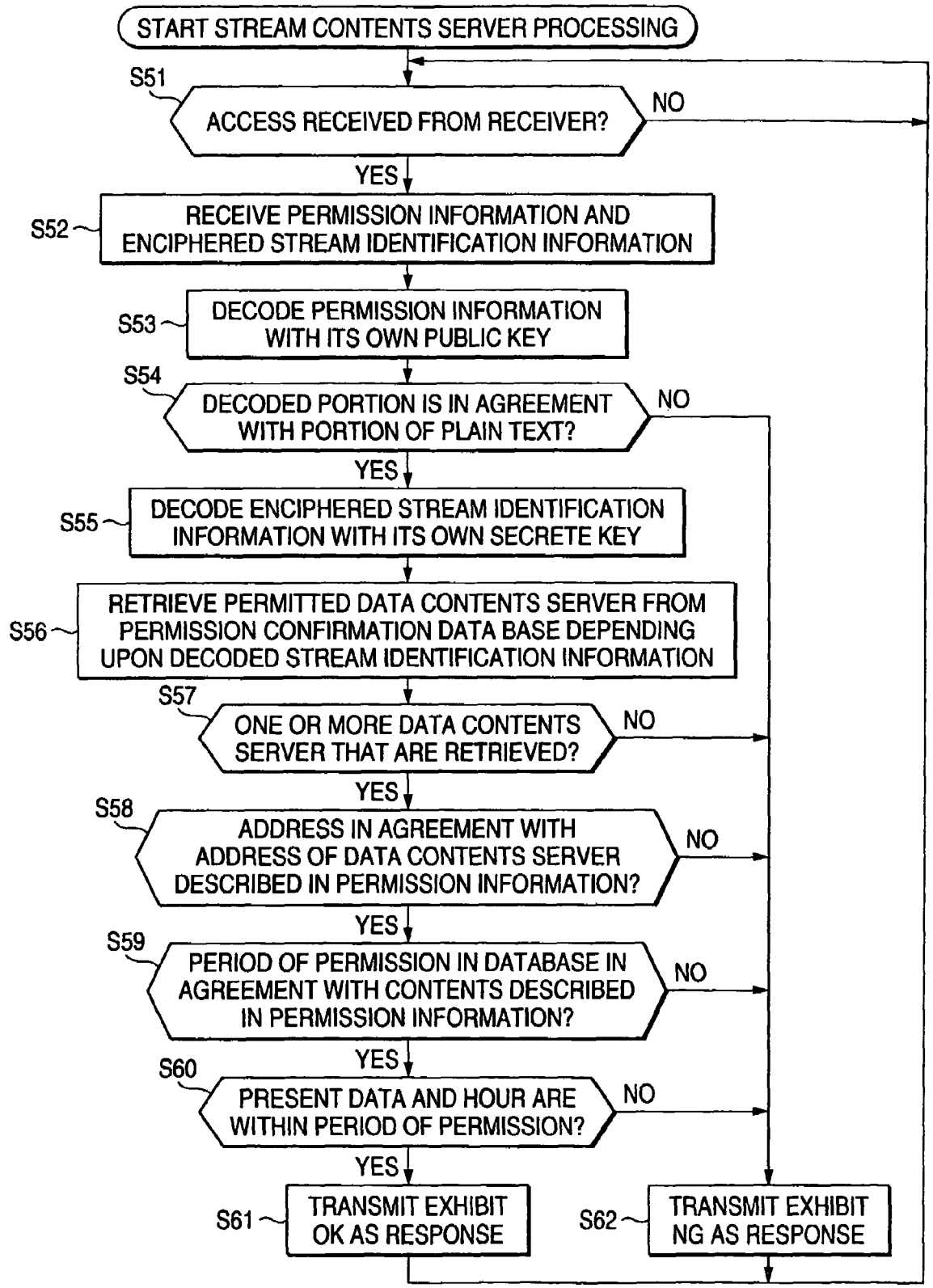
FIG. 13 is a flowchart illustrating the processing of the stream contents server of FIG. 1.

Next, described below in further detail with reference to a flowchart of FIG. 13 is a processing of the stream contents server 3 executed in response to the processing of the digital TV receiver 7.

At step S51, the CPU 121 in the stream contents server 3 stands by until it receives an access from the digital TV receiver 7. Upon receipt of the access, the CPU 121 proceeds to step S52 to receive the permission information and the enciphered stream identification information. The permission information and the enciphered stream identification information are transmitted from the digital TV receiver 7 through a processing at step S30 in FIG. 9.

Upon receipt of the permission information and the enciphered stream identification information from the communication unit 129 through the Internet 8, the stream contents server 3 at step S53 decodes the permission information with its own public key stored in the storage unit 128. Namely, as shown in FIG. 11, the permission information includes information I6 that has been enciphered with the secret key of the stream content server 3. The CPU 121 decodes the information I6 with its own public key, and judges at step S54 whether the information I1 to I5 obtained by decoding is in agreement with the information I1 to I5 that have been transmitted in advance in the form of a plain text. When they are not in agreement, it means that the permission information has been manipulated. The routine, therefore, proceeds to step S62 where the CPU 121 transmits the information from the communication unit 129 to the digital TV receiver 7 through the Internet 8 in response to an exhibit NG which expresses that the reference to the stream contents has not been permitted.

When it is judged at step S54 that the information I1 to I5 obtained by decoding is in agreement with information I1 to I5 that have been transmitted in the form of a plain text, the CPU 121 proceeds to step S55 and decodes the enciphered stream identification information with the secret key of the stream contents server 3. Namely, as described above, the stream identification information transmitted from the digital TV receiver 7 is in a state of being enciphered with the public key of the stream contents server 3 as shown in FIG. 12, and can be decoded with a corresponding secret key.

At step S56, the CPU 121 retrieves a data contents server permitting the reference to the stream contents from the permission management database stored in the storage unit 128 based on the stream identification information decoded through a processing at step S55.

That is, referring to FIG. 12, when the stream identification information is decoded, there are obtained an ID for identifying the stream, a program name of the stream and a magic number of the stream.

Figure 14:
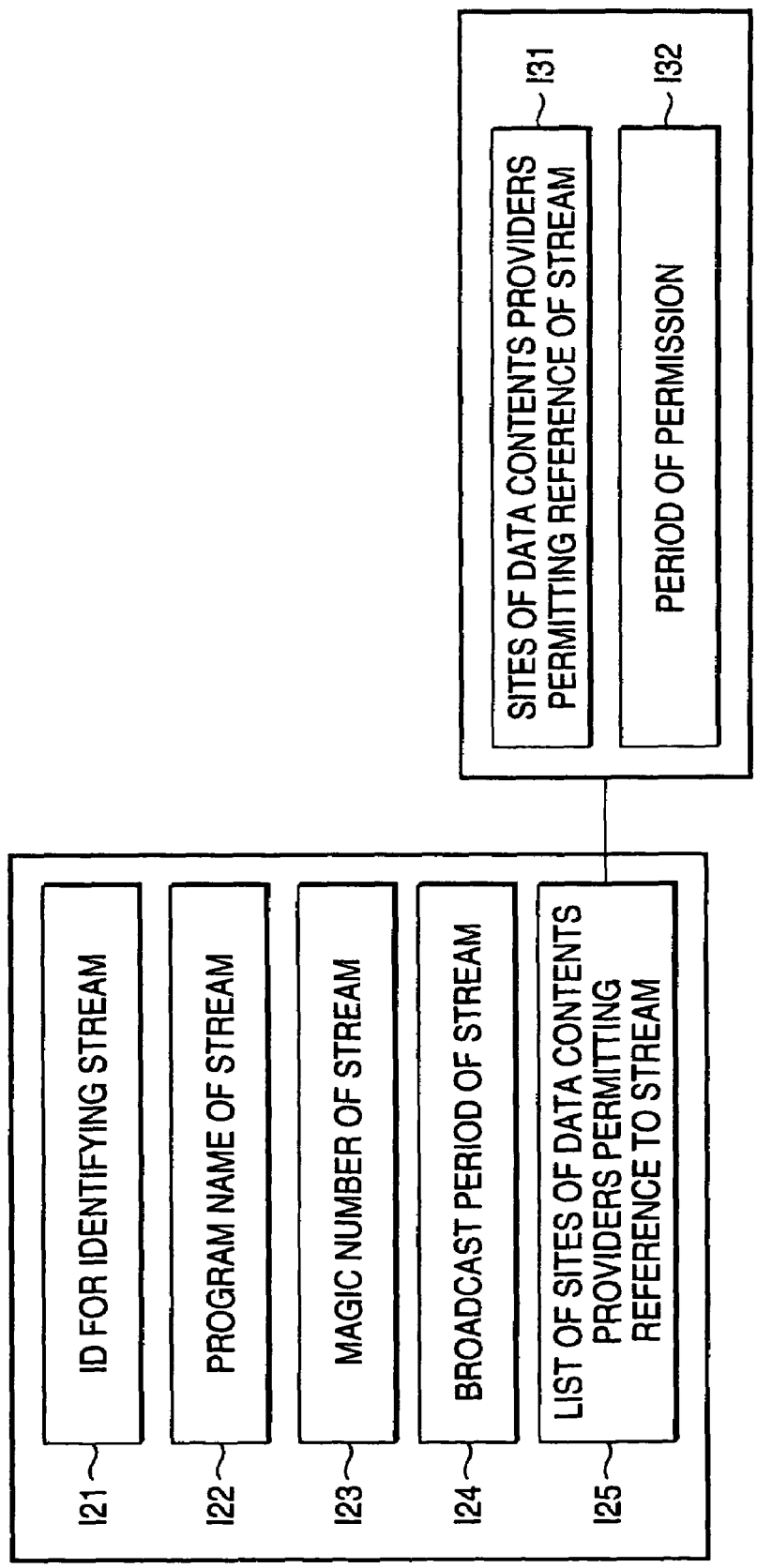
FIG. 14 is a view illustrating a database possessed by the stream contents server of FIG. 1.

On the other hand, a permission confirmation database in the storage unit 128 is holding permission confirmation information shown in, for example, FIG. 14.

The information I21 is an ID for identifying the stream and corresponds to the information I11 which is an ID for identifying the stream in the permission information in FIG. 12. The information I22 is a program name of the stream and corresponds to the information I12 which is the program name of the stream of FIG. 12. Further, the information I23 is a magic number of the stream and corresponds to the information I13 which is the magic number of the stream in FIG. 12.

The information I24 represents a broadcasting period of the stream, and the information I25 represents a list of sites of the data contents providers permitting the reference to the stream.

The information I25 is constituted by those information for each of the sites including the information I31 representing the site (address) of the data contents provider permitting the reference to the stream and the information I32 representing the permission period.

The CPU 121 identifies (specifies) the stream contents based on the information I11 to I13 specified in the stream identification information, and retrieves the identified (specified) stream contents from the information I21 to I23 in the database. The CPU 121 further retrieves the data contents provider permitting the reference to the stream contents from the data I25 of the retrieved stream contents.

At step S57, the CPU 121 judges whether there are one or more data contents servers that are retrieved at step S56. When one or more data contents servers are not existing, it means that no reference is permitted to the stream contents. In this case, therefore, the routine proceeds to step S62 where a transmission processing is executed in response to the exhibit NG.

When there are one or more data contents servers that are retrieved, on the other hand, the routine proceeds to step S58 where the CPU 121 judges whether an address in agreement with the address of the data contents server described in the permission information is existing in the information I31 which is a list of data content servers retrieved at step S56. When there is no address that is in agreement, it means that the data contents provider described in the permission information is no permitting the stream contents. Therefore, a transmission processing is executed at step S62 in response to the exhibit NG.

When it is judged at step S58 that an address in agreement with the address of the data contents server described in the permission information is existing in the database, the routine proceeds to step S59 where it is judged whether the permission period in the data base is in agreement with the content described in the permission information. Namely, it is judged whether the permission period which is the information I32 shown in FIG. 14 is in agreement with the permission period which is the information I3 in the permission information shown in FIG. 11. If the two are not in agreement, it is probable that the permission information has been altered. In this case, too, therefore, the routine proceeds to step S62, and a transmission processing is executed in response to the exhibit NG.

When the two permission periods are in agreement, the routine proceeds to step S60 where the CPU 121 judges whether the present date and hour counted by the incorporated timer are within the permitted period. When the present date and hour are not within the permitted period, reference cannot be made to the object stream contents. Therefore, the routine proceeds to step S62 to execute the transmission processing in response to the exhibit NG.

When it is judged at step S60 that the present date and hour are within the permission period, the CPU 121 executes the transmission processing in response to the exhibit OK. After the processing at step S61 or S62, the routine returns back to step S51 to repeat the subsequent processings.

Figure 9:
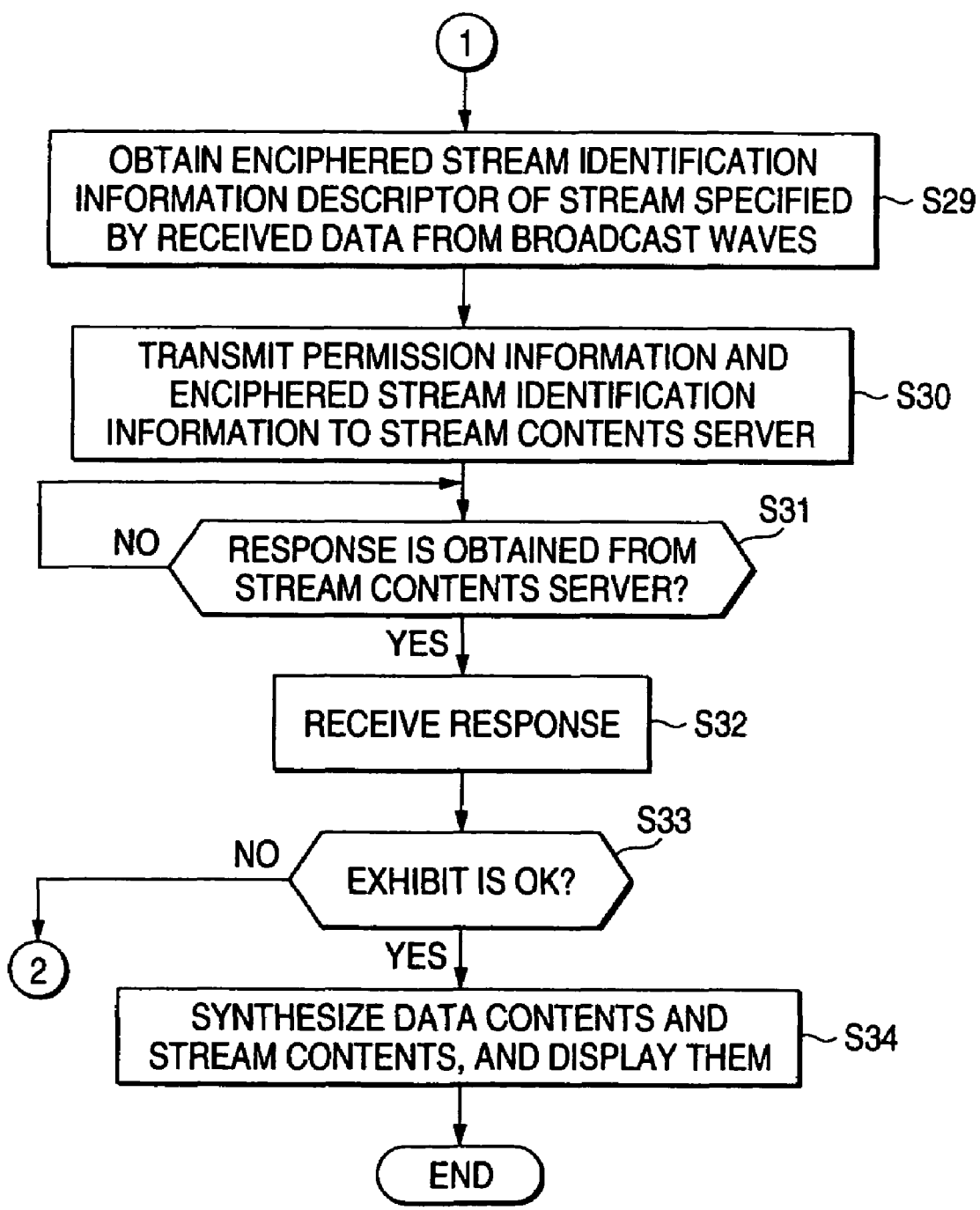
FIG. 9 is a flowchart illustrating the processing of the digital TV receiver that follows FIG. 8.

Based on a response transmitted through a processing at step S61 or S62 as described above, the digital TV receiver 7 executes the judging processing at step S33 in FIG. 9, synthesizes the stream contents data on the same screen as the contents based on the result of judgement, and executes the exhibit processing (processing of step S34) as shown n FIG. 2B or executes the processing (processing of step S28 in FIG. 8) for displaying the data contents only but without displaying the stream contents as shown in FIG. 2C.

In the foregoing description, the data contents comprising chiefly the text contents are delivered through the Internet 8 and the stream contents comprising chiefly the picture contents are delivered through the broadcast. The present invention, however, can be applied even when both of them are delivered through the Internet 8.

The above series of processings can also be executed by a hardware as well as by a software. When a series of processings are to be executed by the software, there may be used a computer in which a program constituting the software has been incorporated in a dedicated hardware, or various programs may be installed in, for example, a general-purpose personal computer that is capable of executing a variety of functions from a network or a recording medium.

Referring to FIGS. 5 and 6, the recording medium is constituted not only by a magnetic disk 141, 241 (inclusive of a floppy disk), an optical disk 142, 242 (inclusive of a CD-ROM (compact disk read-only memory), a DVD (a digital versatile disk)), a magnetic-optic disk 143, 243 (inclusive of an MD (mini-disk)) recording programs, or a package medium such as of a semiconductor memory 144, 244, but also by a ROM 122, 222 recording a program provided to the users in a state of being incorporated in the apparatus in advance, or by a hard disk included in the storage unit 128, 228.

In this specification, steps for describing programs to be recorded into the recording medium include processings that are executed in time series along the order that is described, as well as processings that are not necessarily executed in time series but are executed in parallel or individually.

In this specification, the system stands for the entire equipment constituted by a plurality of apparatuses.

INDUSTRIAL APPLICABILITY

According to the information providing system and information providing method of the present invention as described above, the second information providing apparatus issues permission information to the first information providing apparatus to permit the reference to the second information, and the first information provides the first information to the information processing apparatus while including the permission information therein. The information processing apparatus extracts the identification information from the second information provided by the second information providing apparatus, and transmits it to the second information providing apparatus together with the permission information included in the first information. The second information providing apparatus judges whether the reference to the second information based on the first information be permitted relying upon the permission information and the identification information received from the information processing apparatus, and the information processing apparatus controls the reference to the second information based on the first information relying upon the result of judgement.

There is thus realized a system which suppresses unauthorized use of the second information neglecting the copyright.

According to the information processing apparatus and method, recording medium and program of the present invention, permission information is extracted from the first information provided by the first information providing apparatus, identification information is extracted from the second information provided by the second information providing apparatus, the permission information and identification information that are extracted are transmitted to the second information providing apparatus, and reference to the second information based on the first information is controlled relying upon the above information and upon the result of judgement transmitted from the second information providing apparatus. Therefore, the second information is prevented from being output and utilized without authorization.

According to the first information providing apparatus and method, recording medium and program of the present invention, permission information obtained from other information providing apparatuses is included in the first information and is provided to the information processing apparatus. Therefore, the first information is provided to the information processing apparatus while preventing the second information from being used without authorization.

According to the second information providing apparatus and method, recording medium and program of the present invention, permission information is issued to the other information providing apparatuses, the second information is provided to the information processing apparatus while adding the identification information thereto, it is judged whether the reference to the second information based on the first information be permitted relying upon the permission information and identification information received from the information processing apparatus, and the result of judgement is transmitted to the information processing apparatus. Therefore, the second information provided by itself is prevented from being used without authorization.

The invention claimed is:

1. A networked video delivery system for displaying data content and video content referenced by the data content, comprising:
   a data content server for providing said data content over a network;
   a video streaming server for streaming encoded video content referenced by the data content; and
   a receiver for receiving the data content provided by the data content server and the encoded video content streamed from the video streaming server; and
   an authentication server for issuing over the network a first site certificate to the video streaming server, a second site certificate to the data content server, and a root site certificate; said first site certificate containing a public key; the first site certificate, the second site certificate, and the root site certificate being previously stored in the receiver;

wherein said video streaming server issues permission information to said data content server permitting reference to the video content in response to a request from the data content server;

wherein said receiver requests and checks the first site certificate from the video streaming server, the second site certificate from the data content server, and the root site certificate from the authentication server based on the previously stored first site certificate, second site certificate, and root site certificate;

wherein the data content server provides the data content and the permission information received from the video streaming server to the receiver;

wherein the receiver requests permission from the video streaming server to decode the encoded video content by sending the permission information provided with the data content;

wherein the video streaming server judges warrantability of the permission information from the receiver and transmits a judging result to the receiver, wherein the judging of the warrantability of the permission information includes a determination whether the permission information includes predetermined data held by the video streaming server;

wherein the receiver decodes the encoded video content upon receipt of the judging result and displays the data content and the video content referenced by the data content.

2. The networked video delivery system according to claim 1, wherein the video streaming server broadcasts the encoded video content to the receiver.

3. The networked video delivery system according to claim 1, wherein the video streaming server includes identification information referencing the video content with the encoded video content streamed to the receiver.

4. The networked video delivery system according to claim 3, wherein the identification information has been enciphered by a public key of said video streaming server.

5. The networked video delivery system according to claim 1, wherein the permission information may include a video content title, a time period for permission, a video streaming server address, and a data content server address.

6. A method of delivering data content and video content referenced by the data content in a networked video delivery system, comprising the steps of:

sending a first site certificate from an authentication server to a video streaming server;

sending a second site certificate from the authentication server to a data content server;

sending permission information from the video streaming server to the data content server permitting data content in the data content server to reference video content in the video streaming server;

requesting and checking the first site certificate from the video streaming server with a previously stored first site certificate in a receiver;

requesting and checking the second site certificate from the data content server with a previously stored second site certificate in the receiver;

requesting and checking a root site certificate from the authentication server with a previously stored root site certificate in the receiver;

sending the data content and the permission information from the data content server to the receiver;

streaming encoded video content referenced by the data content from the video streaming server to the receiver;

requesting permission to decode the encoded video content by sending the permission information from the receiver to the video streaming server;

judging warrantability of the permission information from the receiver in the video streaming server and transmitting a judging result to the receiver, wherein the judging of the warrantability of the permission information includes a determination whether the permission information includes predetermined data held by the video streaming server; and decoding the encoded video content in the receiver upon receipt of the judging result and displaying the data content and the video content referenced by the data content.

7. The method according to claim 6, wherein the video streaming server broadcasts the encoded video content to the receiver.

8. The method according to claim 6, wherein the video streaming server includes identification information referencing the video content with the encoded video content streamed to the receiver.

9. The method according to claim 8, wherein the identification information has been enciphered by a public key of said video streaming server.

10. The method according to claim 6, wherein the permission information may include a video content title, a time period for permission, a video streaming server address, and a data content server address.

11. A receiver for receiving and displaying data content and video content referenced by the data content in a networked video delivery system, comprising:

first receiving means for receiving said data content over a network from a data content server;

second receiving means for receiving encoded video content referenced by the data content streamed from a video streaming server;

certificate management means for authenticating a first site certificate from the video streaming server, a second site certificate from the data content server, and a root site certificate from an authentication server based on a previously stored first site certificate, a previously stored second site certificate, and a previously stored root site certificate;

first extracting means for extracting permission information from the data content; wherein the permission information permits the data content referencing of the video content;

permission requesting means for requesting permission from the video streaming server to decode the encoded video content by sending the permission information extracted from the data content;

third receiving means for receiving a judging result from the video streaming server on the warrantability of the permission information sent from the receiver, wherein the warrantability of the permission information is based on a determination whether the permission information includes predetermined data held by the video streaming server;

decoding means for decoding the encoded video content upon receipt of the judging result; and display means for displaying the data content and the video content referenced by the data content.

12. The receiver according to claim 11, wherein the video streaming server broadcasts the encoded video content to the receiver.

13. The receiver according to claim 11, wherein the video streaming server includes identification information referencing the video content with the encoded video content streamed to the receiver.

14. The receiver according to claim 13, wherein the identification information has been enciphered by a public key of said video streaming server.

15. The receiver according to claim 11, wherein the permission information may include a video content title, a time period for permission, a video streaming server address, and a data content server address.

16. A video broadcasting system for displaying data content transmitted over a first network and video content transmitted over a second network, wherein the video content is referenced by the data content, comprising:
- a data content server for providing the data content over the first network;
- a video broadcasting apparatus for broadcasting the video content in an encoded format over the second network;
- a video streaming server for issuing permission information to said data content server, the permission information permitting reference to the video content in reasons to a request from the data content server;
- a receiver for receiving the data content provided by the data content server and the video content broadcast from the video broadcasting apparatus;
- an authentication server for issuing a first site certificate to the video streaming server, a second site certificate to the data content server, and a root certificate to the receiver;
- wherein the video streaming server provides the first site certificate to the receiver over the second network;
- wherein the data content server provides the data content and the second site certificate to the receiver over the first network;
- wherein the data content server provides the permission information to the receiver if the video streaming server issued the permission information for the data content; and
- wherein the video streaming server judges the warrantability of the permission information received from the receiver, wherein the judging of the warrantability of the permission information includes a determination whether the permission information includes predetermined data held by the video streaming server.

17. The video broadcasting system according to claim 16, wherein the first site certificate and the second site certificate have address information of the authentication server.

18. The video broadcasting system according to claim 16, wherein the permission information has identification information referencing the video content.

19. The video broadcasting system according to claim 18, wherein the identification information is encrypted by a secret key of the video streaming server.

20. The receiver according to claim 12, wherein the video content is streamed over a second network different from the network over which the data content is received.

21. The receiver according to claim 11, wherein the permission request means previously issued the root site certificate.

* * * * *

UNITED STATES PATENT AND TRADEMARK OFFICE
CERTIFICATE OF CORRECTION

PATENT NO. : 7,509,430 B2
APPLICATION NO. : 10/487959
DATED : March 24, 2009
INVENTOR(S) : Yoshinori Oota It is certified that error appears in the above-identified patent and that said Letters Patent is hereby corrected as shown below:

Column 25, line 25, "in reasons" should read -- in response --.

Signed and Sealed this

Eighteenth Day of May, 2010

David J. Kappos
*Director of the United States Patent and Trademark Office*